(12) United States Patent
Jo et al.

(10) Patent No.: US 12,075,450 B2
(45) Date of Patent: Aug. 27, 2024

(54) METHOD AND APPARATUS FOR PERFORMING RADIO ACCESS NETWORK FUNCTION

(71) Applicant: Samsung Electronics Co., Ltd., Suwon-si (KR)

(72) Inventors: Hyuna Jo, Suwon-si (KR); Changbae Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 392 days.

(21) Appl. No.: 17/567,374

(22) Filed: Jan. 3, 2022

(65) Prior Publication Data

US 2022/0183026 A1 Jun. 9, 2022

Related U.S. Application Data

(63) Continuation of application No. PCT/KR2021/018213, filed on Dec. 3, 2021.

(30) Foreign Application Priority Data

Dec. 4, 2020 (KR) .................. 10-2020-0168719

(51) Int. Cl.
*H04W 72/12* (2023.01)
*H04W 72/52* (2023.01)
(52) U.S. Cl.
CPC .................. *H04W 72/52* (2023.01)
(58) Field of Classification Search
CPC .................................................. H04W 72/52
See application file for complete search history.

(56) References Cited

U.S. PATENT DOCUMENTS

| 7,673,099 B1 | 3/2010 | Beaverson et al. |
| 8,135,382 B1 | 3/2012 | Green et al. |

(Continued)

FOREIGN PATENT DOCUMENTS

| CN | 111427696 A | 7/2020 |
| CN | 111885730 A | 11/2020 |

(Continued)

OTHER PUBLICATIONS

International Search Report dated Mar. 3, 2022, issued in International Application No. PCT/KR2021/018213.
ITU-T Study Group 15, Liaison on Cooperative Dynamic Bandwidth Assignment, RP-182091, 3GPP TSG RAN Meeting #81, XP051553922, Sep. 11, 2018, Gold Coast, Australia.

(Continued)

*Primary Examiner* — Kouroush Mohebbi
(74) *Attorney, Agent, or Firm* — Jefferson IP Law, LLP

(57) ABSTRACT

A technology for performing a radio access network function is provided. A server for performing the radio access network function obtains information about traffic to be generated at one or more base stations, based on a scheduling request regarding the one or more base stations, determines information about time latency and a radio resource requested regarding the traffic, based on the information about the traffic to be generated, determines scheduling information about a processor resource assigned on at least one pipeline of the at least one processor to process the traffic, based on the information about the time latency and radio resource, and an available processor resource at the server, and processes the traffic by the at least one pipeline, based on the scheduling information.

15 Claims, 14 Drawing Sheets

(56) References Cited

U.S. PATENT DOCUMENTS

| | | |
|---|---|---|
| 9,584,281 B2 | 2/2017 | Tavildar et al. |
| 9,699,766 B2 | 7/2017 | Chen et al. |
| 10,462,783 B2 | 10/2019 | Dame |
| 11,140,564 B2 | 10/2021 | Jo et al. |
| 2006/0224862 A1 | 10/2006 | Ahmed et al. |
| 2008/0259862 A1 | 10/2008 | Yeo et al. |
| 2010/0220645 A1 | 9/2010 | Kwon et al. |
| 2013/0051326 A1 | 2/2013 | Jeyatharan et al. |
| 2013/0170440 A1 | 7/2013 | Tavildar et al. |
| 2017/0264500 A1* | 9/2017 | Koizumi .................. G06F 9/505 |
| 2018/0203727 A1 | 7/2018 | Jarvis et al. |
| 2019/0140933 A1* | 5/2019 | Guim Bernat ...... H04L 47/2425 |
| 2020/0389906 A1 | 12/2020 | Kim et al. |
| 2022/0197773 A1* | 6/2022 | Butler ..................... G06F 9/505 |

FOREIGN PATENT DOCUMENTS

| | | |
|---|---|---|
| KR | 10-2009-0052784 A | 5/2009 |
| KR | 10-1075238 B1 | 10/2011 |
| KR | 10-2013-0139684 A | 12/2013 |
| KR | 10-2014-0116899 A | 10/2014 |
| KR | 10-2019-0062213 A | 6/2019 |
| KR | 10-1953906 B1 | 6/2019 |
| WO | 2019/010734 A1 | 1/2019 |
| WO | 2020/057766 A1 | 3/2020 |

OTHER PUBLICATIONS

European Search Report dated Mar. 11, 2024, issued in European Application No. 21901063.4.

\* cited by examiner

METHOD AND APPARATUS FOR PERFORMING RADIO ACCESS NETWORK FUNCTION

CROSS-REFERENCE TO RELATED APPLICATION(S)

This application is a continuation application, claiming priority under § 365(c), of an International application No. PCT/KR2021/018213, filed on Dec. 3, 2021, which is based on and claims the benefit of a Korean patent application number 10-2020-0168719, filed on Dec. 4, 2020, in the Korean Intellectual Property Office, the disclosure of which is incorporated by reference herein in its entirety.

TECHNICAL FIELD

The disclosure relates to a method and apparatus for performing a radio access network function.

BACKGROUND ART

To meet the increase in demand with respect to wireless data traffic after the commercialization of 4th generation (4G) communication systems, considerable efforts have been made to develop pre-5th generation (5G) communication systems or 5G communication systems. This is one reason why 5G communication systems or pre-5G communication systems are called beyond 4G network communication systems or post long-term evolution (LTE) systems.

In order to improve system networks for 5G communication systems, various technologies have been developed, such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation.

The Internet has evolved from a human-based connection network, where humans create and consume information, to the Internet of Things (IoT), where distributed configurations, such as objects, exchange information with each other to process the information. Internet of everything (IoE) technology is emerging, in which technology related to the IoT is combined with, for example, technology for processing big data through connection with a cloud server. In the IoT environment, intelligent Information technology (IT) services may be provided to collect and analyze data obtained from objects connected to each other to create new value in human life. As existing IT techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, 5G communication such as sensor networks, machine-to-machine (M2M) communication, machine type communication (MTC), etc., are being implemented by using techniques such as beam-forming, multiple input-multiple output (MIMO), array antennas, etc. The application of cloud radio access network (RAN) as a big data processing technology described above may be an example of convergence of 5G technology and IoT technology.

As various technologies are applicable as described above and with the development of a wireless communication system, a method for efficiently managing a radio access network (RAN) via such various technologies is requested.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

Aspects of the disclosure are to address at least the above-mentioned problems and/or disadvantages and to provide at least the advantages described below. Accordingly, an aspect of the disclosure is to provide a method and apparatus for performing a radio access network function in a wireless communication system.

Additional aspects will be set forth in part in the description which follows and, in part, will be apparent from the description, or may be learned by practice of the presented embodiments.

Solution to Problem

In accordance with an aspect of the disclosure, a method, performed by a server, of performing a radio access network function is provided. The method includes obtaining information about traffic to be generated at one or more base stations, based on a scheduling request regarding the one or more base stations, determining information about time latency and a radio resource requested regarding the traffic, based on the information about the traffic to be generated, determining scheduling information about a processor resource assigned on at least one pipeline of the at least one processor to process the traffic, based on the information about the time latency and radio resource, and an available processor resource at the server, and processing the traffic by the at least one pipeline, based on the scheduling information.

The determining of the scheduling information may include when the time latency requested regarding the traffic is less than a threshold value, determining the scheduling information such that all processor resources requested to process the traffic are assigned, and when the time latency requested regarding the traffic is equal to or greater than the threshold value, determining the scheduling information such that a minimum processor resource of a pre-set size is assigned.

The processing of the traffic may include when a size of the processor resource assigned to the traffic exceeds a size of the available processor resource at the server, processing the traffic after traffic pre-assigned to the at least one pipeline is processed, and when the size of the processor resource assigned to the traffic is smaller than or equal to the size of the available processor resource at the server, processing, by a new pipeline generated to process the traffic, the traffic.

The processing of the traffic may include, when a size of the processor resource assigned to the traffic exceeds a size of the available processor resource at the server and the processing of the traffic has a higher priority than processing of traffic pre-assigned to the at least one pipeline, stopping the processing of the pre-assigned traffic and processing the traffic.

The processing of the traffic may include when the processing of the pre-assigned traffic is stopped, generating a new pipeline to process the traffic, and processing the traffic by the generated new pipeline.

The method may further include obtaining resource monitoring information about a processor resource requested to process traffic generated before the scheduling request, wherein the determining of the scheduling information includes determining the processor resource required to process the traffic, based on the information about the time latency and radio resource requested regarding the traffic, by using the resource monitoring information.

The information about the traffic to be generated at the one or more base stations may include information about a size and type of the traffic to be generated at the one or more base stations, and the type of the traffic may be classified according to at least one performance from among a data transmission speed requested for each service that generated the traffic, a transmission latency, and connection density.

The obtaining of the information about the traffic to be generated may include identifying a pattern of generated traffic for each type of the traffic, based on traffic processing information at the server before the scheduling request, and obtaining the information about the traffic to be generated at the one or more base stations, based on the identified pattern of the traffic.

The information about the radio resource may include information about at least one of a time-frequency resource for transmission/reception of the traffic, a transmission/reception mode between the one or more base stations and a terminal, a number of antenna ports, a number of layers, or channel coding and modulation techniques.

The determining of the scheduling information may include determining the scheduling information regarding the processor resource, based on the information about the time latency and radio resource and the available processor resource at the server, by using a pre-generated learning network model.

In accordance with another aspect of the disclosure, a server for performing a radio access network function is provided. The server includes a transceiver, a memory storing one or more instructions, and at least one processor configured to execute the one or more instructions stored in the memory to obtain information about traffic to be generated at one or more base stations, based on a scheduling request regarding the one or more base stations, determine information about time latency and a radio resource requested regarding the traffic, based on the information about the traffic to be generated, determine scheduling information about a processor resource assigned on at least one pipeline of the at least one processor to process the traffic, based on the information about the time latency and radio resource, and an available processor resource at the server, and process the traffic by the at least one pipeline, based on the scheduling information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE OF DISCLOSURE

Figure 1:
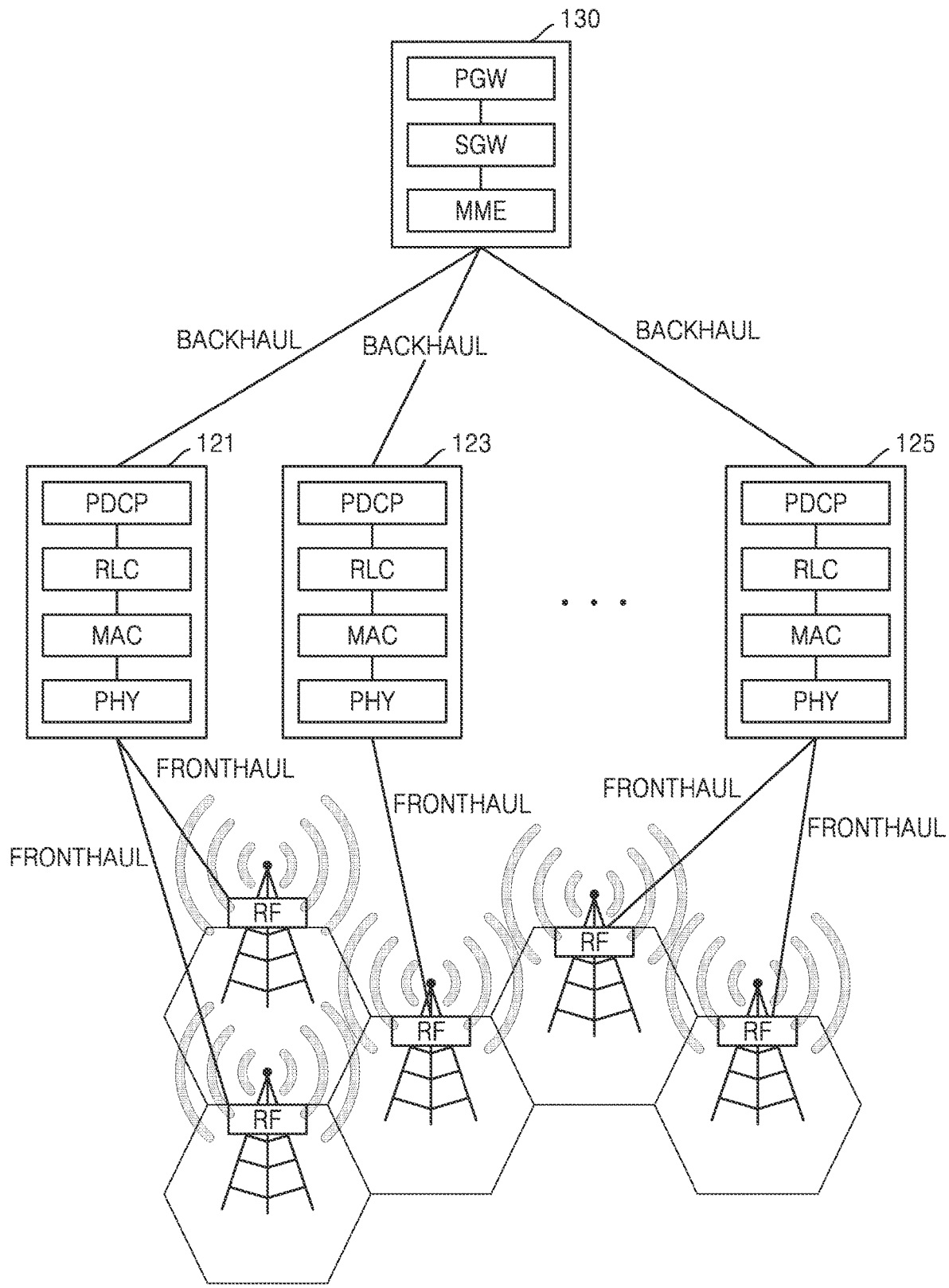
FIG. 1 is a diagram of a structure of a centralized/cloud radio access network (cRAN) according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Hereinafter, embodiments of the present disclosure will be described in detail with reference to the accompanying drawings. In describing the embodiments, descriptions of technical contents that are well known in the technical field related to the present disclosure and are not directly related to the present disclosure will be omitted. This is to more clearly convey the gist of the present disclosure without obscuring the gist of the present disclosure by omitting unnecessary description.

For the same reasons, components may be exaggerated, omitted, or schematically illustrated in drawings for clarity. Also, the size of each component does not completely reflect the actual size. In the drawings, like reference numerals denote like elements.

Advantages and features of the disclosure and methods of accomplishing the same may be understood more readily by reference to the following detailed description of the embodiments of the disclosure and the accompanying drawings. In this regard, the embodiments of the disclosure may have different forms and should not be construed as being limited to the descriptions set forth herein. Rather, these embodiments of the disclosure are provided so that the disclosure will be thorough and complete and will fully convey the concept of the disclosure to one of ordinary skill in the art, and the disclosure will only be defined by the appended claims. Throughout the specification, like reference numerals denote like elements.

It will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

The term "unit" in the description refers to a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments of the disclosure, the "unit" may include at least one processor.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra mobile broadband (UMB) of 3GPP2, IEEE 802.16e or the like. Also, a 5th generation (5G) or new radio (NR) wireless communication system is being developed as a next-generation wireless communication system.

In the next-generation wireless communication system, at least one service among an enhanced mobile broadband (eMBB), massive machine type communications (mMTC), and ultra-reliable and low-latency communications (URLLC) may be provided to a terminal. Such services may be provided to a same terminal or different terminals during a same time interval. The eMBB may be a service aiming at high-speed transmission of high-capacity data, the mMTC may be a service aiming at terminal power minimization and multiple terminal connections, and the URLLC may be a service aiming at high reliability and low delay, but the eMBB, mMTC, and URLLC are not limited thereto. Such services may be scenarios important in a wireless communication system, such as a long-term evolution (LTE) system or a 5G/NR system after LTE.

Hereinafter, for convenience of description, the disclosure uses terms and names defined by the 3rd generation partnership project long term evolution (3GPP LTE) standard, or terms and names modified based thereon. However, the disclosure is not limited by such terms and names, and may be equally applied to wireless communication systems conforming to other standards. For example, embodiments of the disclosure are described with an example of 5G (or NR) wireless communication technology system, but an embodiment of the disclosure may be applied to other wireless communication systems having a similar technical background or channel type. As another example, an embodiment of the disclosure may be applied to an LTE or LTE-advanced (LTE-A) system that is a wireless communication system before NR, and in addition, an embodiment of the disclosure may also be applied to a wireless communication system developed after NR. In addition, it will be understood by one of ordinary skill in the art that an embodiment of the disclosure may be applied to other communication systems through some modifications without departing from the scope of the disclosure.

Terms for identifying access nodes, terms denoting network entities, terms denoting messages, terms denoting interfaces between network entities, terms denoting various types of identification information, etc. used herein are exemplified for convenience of description. Thus, the terms used in the disclosure are not limited and other terms denoting targets having the same technical meanings may be used.

In the disclosure, a base station is an entity that assigns resources of a terminal, and may be at least one of a gNode B (gNB), an eNode B (eNB), a Node B (NB), a wireless access unit, a BS controller, or a node on a network.

In the disclosure, examples of a terminal may include user equipment (UE), a mobile station (MS), a cellular phone, a smartphone, a computer, and a multimedia system capable of performing a communication function.

In the disclosure, a cell may indicate a region covered by one base station in wireless communication. The cell may be classified into a mega cell, a macro cell, a micro cell, or a pico cell, depending on a size thereof, but this is only an example, and a type of the cell is not limited thereto.

In the disclosure, a downlink (DL) is a wireless transmission path of a signal transmitted from a base station to a terminal, and an uplink (UL) is a wireless transmission path of a signal transmitted from a terminal to a base station. In detail, as a representative example of the broadband wireless communication system, the LTE system adopts an orthogonal frequency division multiplexing (OFDM) scheme in a downlink (DL) and adopts a single carrier frequency division multiple access (SC-FDMA) scheme in an uplink (UL). The UL refers to a radio link through which a terminal (UE or MS) transmits data or a control signal to a base station (gNB or BS), and the DL refers to a radio link through which a base station transmits data or a control signal to a terminal.

FIG. 1 is a diagram of a structure of a centralized/cloud radio access network (cRAN) according to an embodiment of the disclosure.

Referring to FIG. 1, in the cRAN, a radio unit (RU) and a data unit (DU) included in a base station, according to the related art, may be separated, and the RU may be located of a cell site and the DU (e.g., a DU 121) may be located at a central server. A cell may correspond to a region covered by a base station in a wireless communication system, and at least one cell may be present per base station. Unlike an integrated base station in which both an RU and a DU are present in a cell site, in the cRAN, RUs may be arranged at base stations of the cell site and DUs 121, 123, and 125 may be gathered at one place, such that at least some of a radio access network functions are performed. Descriptions about the radio access network functions will be described later. The cRAN may gather the DUs 121, 123, and 125 for management to not only easily adjust inter-cell interference, but also provide a service, such as coordinated multi-point transmission and reception (CoMP).

The base stations of the cell site may include radio frequency (RF) devices or the like, and may transmit signals to a DU (for example, the DU 121) via fronthaul. The fronthaul is a network portion connecting one or more of the base stations of the cell site to a DU (e.g., the DU 121), and may perform digital signal processing (DSP), power amplification, and filtering functions.

A DU (e.g., the DU 121) may process a signal received from a base station of the cell site, and transmit the processed signal to a core network device 130 via backhaul. The core network device 130 may include devices for connecting an end system including a base station and a terminal to the core network device 130. For example, the core network device 130 may include a packet data network gateway (P-GW), a serving gateway (S-GW), and a mobile management entity (MME). The P-GW may connect an internal node of a core network to the external Internet, configure an Internet protocol (IP) address in a terminal, and perform IP packet filtering. The S-GW may buffer a DL packet arrived from the external Internet, when a radio resource control (RRC) connection is not configured in the terminal. The MME may process control signals related to location registration, authentication, and calls of the terminal. However, these are only examples and a configuration of the core network device 130 is not limited thereto.

The backhaul is a network portion connecting a DU (e.g., the DU 121) to the core network device 130, and may be implemented as a wired interface, such as optic fiber, but this is only an example and the backhaul may be implemented as a wireless network.

A DU (e.g., the DU 121) may perform various radio access network functions to process a signal. The radio access network functions may include, for example, a packet data convergence protocol (PDCP) layer function, a radio link control (RLC) layer function, a medium access control (MAC) layer function, and a physical (PHY) layer function, but these are only examples and the radio access network functions are not limited thereto. Hereinafter, functions of a PDCP layer, an RLC layer, an MAC layer, and a PHY layer will be described.

The functions of the PDCP layer may include at least one of following functions:

Header compression and decompression: Robust header compression (ROHC) only
    Transfer of user data
    In-sequence delivery of higher layer protocol data units (PDUs)
    PDCP PDU reordering
    Duplicate detection of lower layer service data units (SDUs)
    Retransmission of PDCP SDUs
    Ciphering and deciphering
    Timer-based SDU discard in uplink The reordering of the PDCP layer indicates a function of sequentially realigning PDCP PDUs received from a lower layer, based on a PDCP sequence number (SN), and may include at least one of a function of delivering data to a higher layer in a realigned order, a function of recording missing PDCP PDUs by realigning an order, a function of transmitting a status report regarding missing PDCP PDUs to a transmitter, or a function of requesting retransmission of missing PDCP PDUs.

The functions of the RLC layer may include at least one of following functions:

Transfer of higher layer PDUs
    In-sequence delivery of higher layer PDUs
    Out-of-sequence delivery of higher layer PDUs
    Error correction through automatic repeat request (ARQ)

Concatenation, segmentation, and reassembly of RLC SDUs
Re-segmentation of RLC data
Reordering of RLC data
Duplicate detection
Protocol error detection
RLC SDU discard
RLC re-establishment The in-sequence delivery of the RLC layer indicates a function of sequentially delivering RLC SDUs received from a lower layer to a higher layer, and may include a function of, when one RLC SDU is segmented and received in several RLC SDUs, reassembling and delivering the RLC SDUs. The in-sequence delivery may include at least one of a function of realigning received RLC PDUs, based on an RLC SN or PDCP SN, a function of reordering and recording missing RLC PDUs, or a function of transmitting a status report regarding missing RLC PDUs to a transmitter. The in-sequence delivery may include a function of requesting retransmission of missing RLC PDUs, and when there is a missing RLC SDU, may include a function of sequentially delivering only RLC SDUs before the missing RLC SDU to a higher layer. The in-sequence delivery may include a function of sequentially delivering all RLC PDUs to a higher layer before a certain timer starts when the certain timer has expired, even when there is a missing RLC SDU, or may include a function of sequentially delivering all RLC SDUs received currently to a higher layer when a certain timer has expired, even when there is a missing RLC SDU.

The RLC layer may process RLC PDUs in an order of reception and transmit the same to the PDCP layer, regardless of an SN. When a segment is received, the RLC layer may combine the received segment with a segment stored in a buffer or segments to be received later to reconfigure one complete RLC PDU, and transmit the RLC PDU to the PDCP layer. Meanwhile, in NR, the RLC layer may not include concatenation, and the concatenation may be performed in the MAC layer or may be replaced by multiplexing in the MAC layer.

The functions of the MAC layer may include at least one of the following functions:
Mapping between logical channels and transport channels
Multiplexing/demultiplexing of MAC SDUs
Scheduling information reporting
Error correction through hybrid automatic request (HARQ)
Priority handling between logical channels of one UE
Priority handling between UEs by means of dynamic scheduling
Multimedia Broadcast Multicast Services (MBMS) identification
Transport format selection
Padding The PHY layer may perform at least one of the following functions:
Data transmission and reception using electric signal
Channel coding/decoding
Modulation/demodulation
Power control
Cell search The PHY layer may perform channel coding and modulation on data of a higher layer, generate an OFDM symbol therefrom, and transmit the OFDM symbol via a wireless channel. Also, the PHY layer may perform demodulation and channel decoding on the OFDM symbol received via the wireless channel, and transmit data obtained as a result thereof to the higher layer.

A base station of the cell site may be described with a term such as an RU or remote radio head (RRH), and a DU (e.g., the DU 121) may be described with a term such as a DU or baseband unit (BBU).

To gather the DUs 121, 123, and 125 performing the radio access network functions described above at one place for management, a method of efficiently using physical resources necessary for data processing is required. In this regard, the disclosure provides a method of performing at least one radio access network function performed by the DUs 121, 123, and 125, via virtualization. The virtualization is a technology capable of expanding a resource that was available in one device, by integrally managing several physical resources, and hereinafter, an example of a virtualized RAN (vRAN) will be described with reference to FIG. 2.

Figure 2:
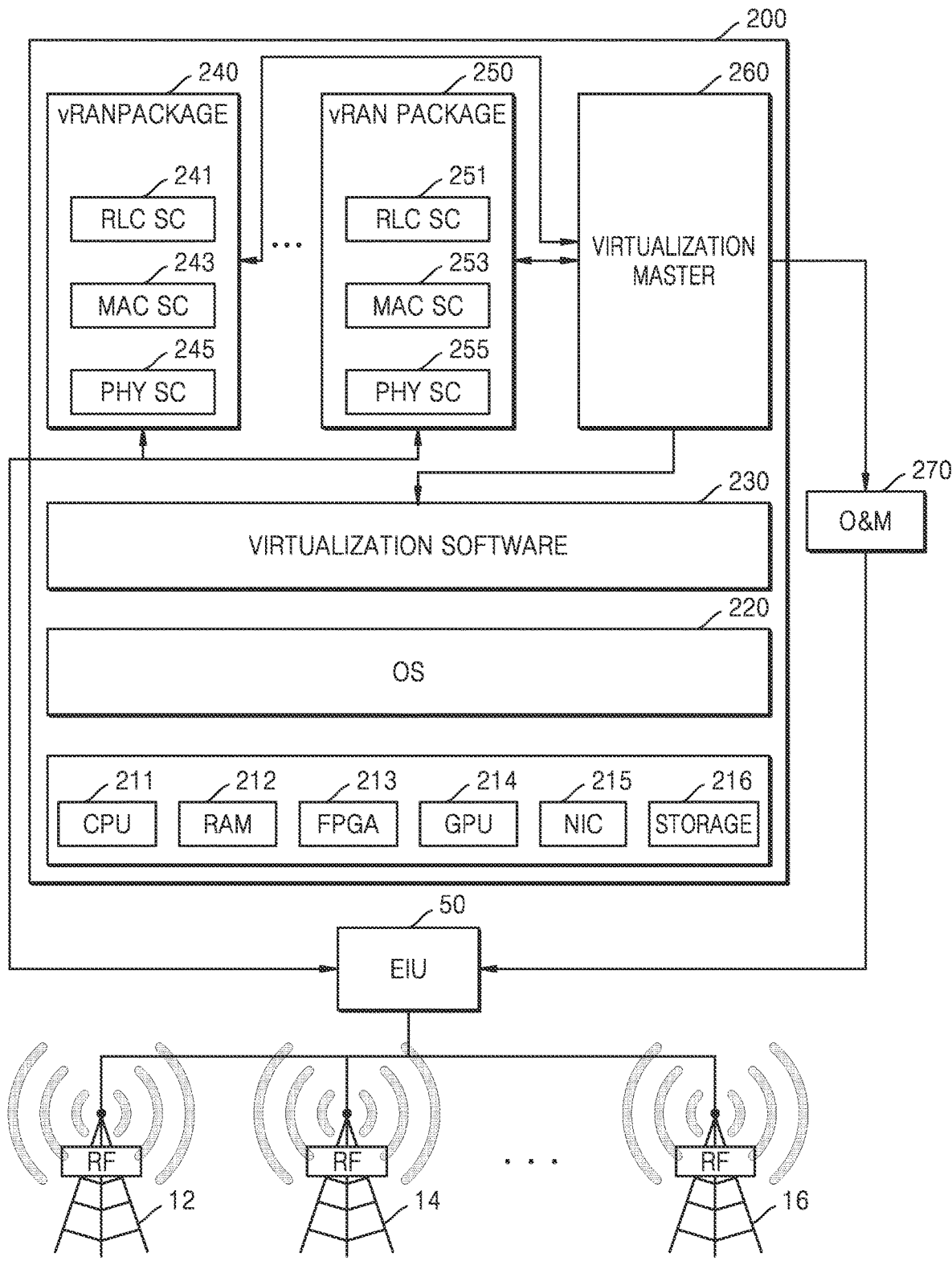
FIG. 2 is a diagram of a virtualization method of an RAN according to an embodiment of the disclosure.

FIG. 2 is a diagram for describing a virtualization method of an RAN according to an embodiment of the disclosure.

Referring to FIG. 2, a server 200 may include hardware capable of driving software for performing a vRAN function. The hardware may include a central processing unit (CPU) 211, a random access memory (RAM) 212, a field programmable gate array (FPGA) 213, a graphics processing unit (GPU) 214, a network interface controller (NIC) 215, and a storage 216, but these are only examples and components of the hardware are not limited thereto. The storage 216 may include a hard disk drive (HDD), a solid state drive (SDD), and the like.

The hardware 210 may execute an operating system (OS) 220. The OS 220 may manage software (e.g., virtualization software 230) executed by the hardware 210 and server 200.

The virtualization software 230 logically isolates a resource managed by the OS 220, and allow several software components (SCs) to share the logically isolated resource. The resource is an item used by vRAN packages 240 and 250 to process traffic. For example, the resource may include the CPU 211, RAM 212, FPGA 213, GPU 214, NIC 215, and storage 216, but these are only examples and the resource is not limited thereto. The logical isolation of the resource may be performed by distributing physical communication paths connecting the resource and the plurality of SCs, via a switch. The SC is provided to be used as a separate server by gathering a library or application required to perform a specific function, and may be generated or removed in units of packages. A package is a minimum unit sharing one IP while including one or more SCs. Examples of the virtualization software 230 may include Kubernetes, and the SC may correspond to a container of the Kubernetes. The virtualization software 230 may include software for managing operation processing of a processor resource, such as the GPU 214, and for example, may include a computed unified device architecture (CUDA).

The SC may be used to perform a network function of the vRAN. Hereinafter, operations of the server 200 for vRAN implementation will be described in detail.

The server 200 may be connected to a plurality of base stations 12, 14, and 16 of a cell site, via an Ethernet interface unit (EIU) 50. The EIU 50 is a part of a passage connecting the plurality of base stations 12, 14, and 16 of the cell site to the server 200, and traffic of a base station may be transmitted to the vRAN packages 240 and 250 via the EIU 50. For example, information about a vRAN package (e.g., the vRAN package 240) assigned to base stations (for example, the base stations 12 and 14) of the cell site may be transmitted via the EIU 50.

The server 200 may perform radio access network functions that were performed by a DU of an integrated base station. The DU may correspond to the DU described above with reference to FIG. 1. Accordingly, each of the plurality of base stations 12, 14, and 16 of the cell site includes an RU including an RF device, and other radio access network functions may be performed by the server 200. For example, the vRAN packages 240 and 250 including PHY SCs 241 and 251, MAC SCs 243 and 253, and RLC SCs 245 and 255, respectively, may be generated in the server 200, and the PHY SCs 241 and 251, MAC SCs 243 and 253, and RLC SCs 245 and 255 may respectively perform the PHY layer function, MAC layer function, and RLC layer function described above. However, this is only an example and the radio access network functions performed by the server 200 are not limited thereto. As another example, the RLC layer function, the PDCP layer function, and the like may be performed by the server 200.

A vRAN package is a minimum unit that may include one or more SCs performing the radio access network function. The vRAN package may include instructions enabling radio access network functions that were previously performed by a hardware device to be performed via virtualization, and an SC may be removed or generated in units of vRAN packages. The server 200 may include one or more vRAN packages 240 and 250.

A virtualization master 260 is a system controlling a vRAN package. The virtualization master 260 may be located in the server 200 or, according to another embodiment of the disclosure, may be located in a device other than the server 200. The virtualization master 260 may transmit, to the virtualization software 230, a command, such as generation or removal of a vRAN package, and update and store vRAN package information changed by the command. Also, the virtualization master 260 may transmit the updated vRAN package information to operation and maintenance (O&M) 270.

The O&M 270 is a device controlling traffic congestion at a user plane of a terminal. In According to an embodiment of the disclosure, the O&M 270 is present outside the server 200, but according to another embodiment of the disclosure the O&M 270 may be located inside the server 200. The O&M 270 may instruct the EIU 50 to assign traffic generated at the plurality of base stations 12, 14, and 16 to each vRAN package.

The virtualization method described above is only an example for implementing a vRAN of the disclosure, and thus another virtualization method may be used. For example, a hypervisor-based virtualization method may be used for vRAN implementation.

Figure 3:
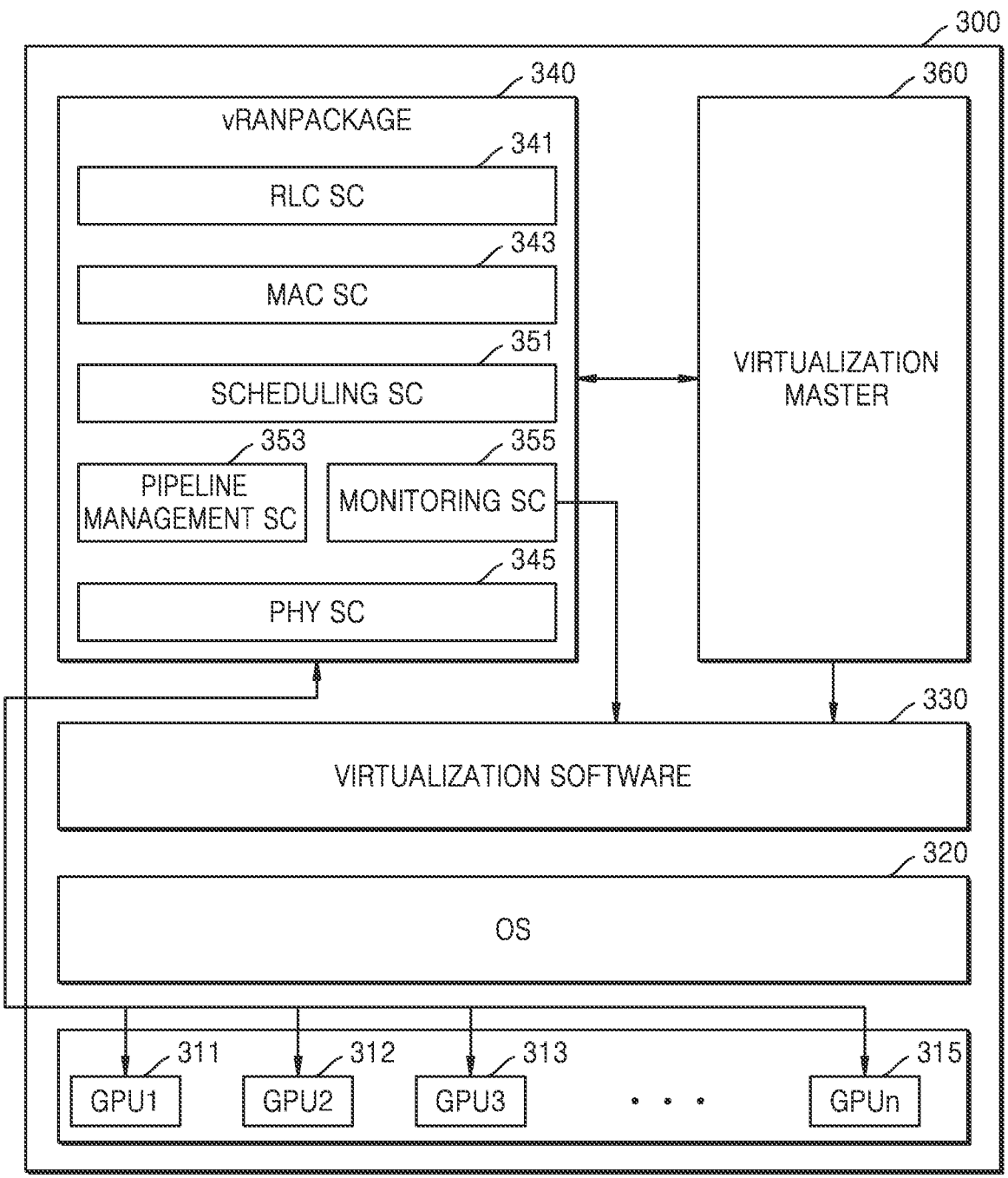
FIG. 3 is a diagram of a virtualized RAN that schedules a processor resource, according to an embodiment of the disclosure.

FIG. 3 is a diagram of a vRAN that schedules a processor resource, according to an embodiment of the disclosure.

Referring to FIG. 3, a server 300 may include hardware capable of driving software for performing a vRAN function. The hardware may include, in addition to a GPU, a CPU, RAM, a storage, and an NIC, but for convenience of description, components other than a GPU are omitted. As illustrated in FIG. 3, a plurality of GPUs 311 through 315 are included in the server 300, but this is only an example and the server 300 may include one GPU. The server 300 may also include an OS 320 and virtualization software 330.

A vRAN package 340 may obtain a scheduling request regarding one or more base stations. The scheduling request may be obtained when a terminal requests assignment of a time-frequency resource to transmit traffic to a base station via a UL, according to an embodiment of the disclosure, or obtained for a service server to provide traffic information to be transmitted via a DL to a plurality of terminals accessing the base station, according to another embodiment of the disclosure.

The traffic is a flow of data passing through a communication network within a certain time. The traffic may include a data flow between the UE and the base station; for example, the traffic may be represented by a data rate per unit time.

Traffic information is information that may directly or indirectly indicate an amount and characteristic of the traffic. The traffic information may include a type of service that generated the traffic (e.g., smart home/building/city, vehicle-to-everything (V2X) streaming, augmented reality/virtual reality (AR/VR), or mission critical (MC)), a type of device (e.g., a smart phone, a sensor, or a narrowband Internet of things (NB-IoT) device), and a type of a wireless communication system where the traffic is generated (for example, NR or LTE). The traffic information may also include the number of terminals that requested traffic transmission/reception, an amount of traffic of a terminal to be transmitted/received (for example, a buffer status report of LTE/NR), an assignment amount of time/frequency assigned for traffic transmission/reception, and a technique of a PHY layer used for traffic transmission/reception (modulation, channel coding, or the like). However, these are only examples and information included in the traffic information is not limited thereto.

The traffic information included in the scheduling request may be transmitted to a scheduling SC 351 after processing at an RLC SC 341 and MAC SC 343.

The scheduling SC 351 may determine information about time latency and radio resource requested regarding the traffic, based on information about the traffic to be generated.

The radio resource is a resource that affects operation complexity of the PHY layer, and for example, may include at least one of the time-frequency resource for traffic transmission/reception, a transmission/reception mode between the base station and the terminal, the number of antenna ports, the number of layers, or channel coding and modulation techniques. The server 300 may determine information about the transmission/reception mode, the number of antenna ports, the number of layers, and the channel coding and modulation techniques, based on capability information of the terminal or a type of the terminal that requested scheduling or the terminal that is to receive the traffic.

The information about the time latency may include a limit on a time taken from a time point when the traffic is generated to a time point when the traffic is processed. The information about the time latency may vary depending on a type of the service that generated the traffic, a type of a device, and a type of the wireless communication system where the traffic is generated. For example, the types of service that generated the traffic may largely include URLLC, mMTC, and eMBB in a case of an NR system, and regarding a service (for example, a tactile Internet service, an industry automation service, an AR service, or a V2X service) classified as URLLC, time latency may be limited to 0.1 to 1 ms, whereas regarding services classified as mMTC and eMBB, time latency may be limited to 100 ms.

Resource information is information that may directly or indirectly indicate a physical resource used to process the traffic. The resource information may include, for example, a proportion of GPU used to process the traffic among GPU assigned to the vRAN package 340, the number of clock cycles used to process the traffic relative to a maximum GPU clock cycles, and a size of a memory assigned to the vRAN package 340 to process the traffic. However, these are only examples, and the traffic information or resource information are not limited thereto.

The scheduling SC 351 may determine the scheduling information regarding a processor resource assigned to process the traffic at at least one pipeline of the GPUs 311 to 315, based on the information about time latency and radio resource, and an available processor resource at the server 300. The pipeline is a data processing structure in which an output of one data processing operation is connected to an input of a next operation.

The scheduling SC 351 may identify the available processor resource at the server 300 to process the traffic to be generated at one or more base stations. The processor resource is a physical resource used to process the traffic, and the available processor resource denotes a physical resource that may be used by the server 300 to process the traffic to be generated at the base station. For example, the available processor resource may include a proportion of CPU or GPU that may be assigned to process the traffic from among entire CPU or GPU, the number of clock cycles that may be used to process the traffic relative to the maximum GPU clock cycles, and a size of the memory that may be assigned to process the traffic. However, these are only examples and the processor resource is not limited thereto.

The scheduling SC 351 may obtain, from a monitoring SC 355, resource monitoring information regarding a processor resource used to process traffic generated before the scheduling request. The scheduling SC 351 may predict the processor resource required to process the traffic, based on the information about time latency and radio resource requested for the traffic to be generated, by using the resource monitoring information.

When the time latency requested regarding the traffic is less than a threshold value, the scheduling SC 351 may determine the scheduling information such that all processor resources requested to process the traffic are assigned. As another example, when the time latency requested regarding the traffic is equal to or greater than the threshold value, the scheduling SC 351 may determine the scheduling information such that a minimum processor resource of a pre-set size is assigned.

The scheduling SC 351 according to an embodiment of the disclosure may determine the scheduling information such that the traffic is processed after traffic pre-assigned to the at least one pipeline is processed, when a size of the processor resource assigned to the traffic exceeds a size of the available processor resource at the server 300. According to another embodiment of the disclosure, the scheduling SC 351 may determine the scheduling information such that processing of the pre-assigned traffic is stopped and newly generated traffic is processed, when the size of the processor resource assigned to the traffic exceeds the size of the available processor resource at the server 300 and the processing of the traffic has a higher priority than the processing of the traffic pre-assigned to the at least one pipeline. The priority may be determined based on the information about the time latency, according to an embodiment of the disclosure. In this case, the scheduling SC 351 may instruct a pipeline management SC 353 to generate a new pipeline, because an available processor resource is generated as the processing of the pre-assigned traffic is stopped.

The scheduling SC 351 may determine the scheduling information such that the traffic is processed at the pipeline newly generated to process the traffic, when the size of the processor resource assigned to the traffic is equal to or smaller than the size of the available processor resource at the server 300. When the traffic is processed at the new pipeline, the traffic is processed in parallel to traffic being processed at an existing pipeline, and thus time latency generated during the processing of the traffic may be reduced.

The pipeline management SC 353 may newly generate a pipeline or maintain an existing pipeline, based on the scheduling information received from the scheduling SC 351. Also, the pipeline management SC 353 may provide, to a PHY SC 345, information about a pipeline at which the traffic to be generated is to be processed, based on the scheduling information.

The monitoring SC 355 may monitor the processor resource used to process the traffic, and store monitored information. The monitoring SC 355 may provide, to the scheduling SC 351, the resource monitoring information regarding the processor resource used to process the traffic generated before the scheduling request.

Figure 4:
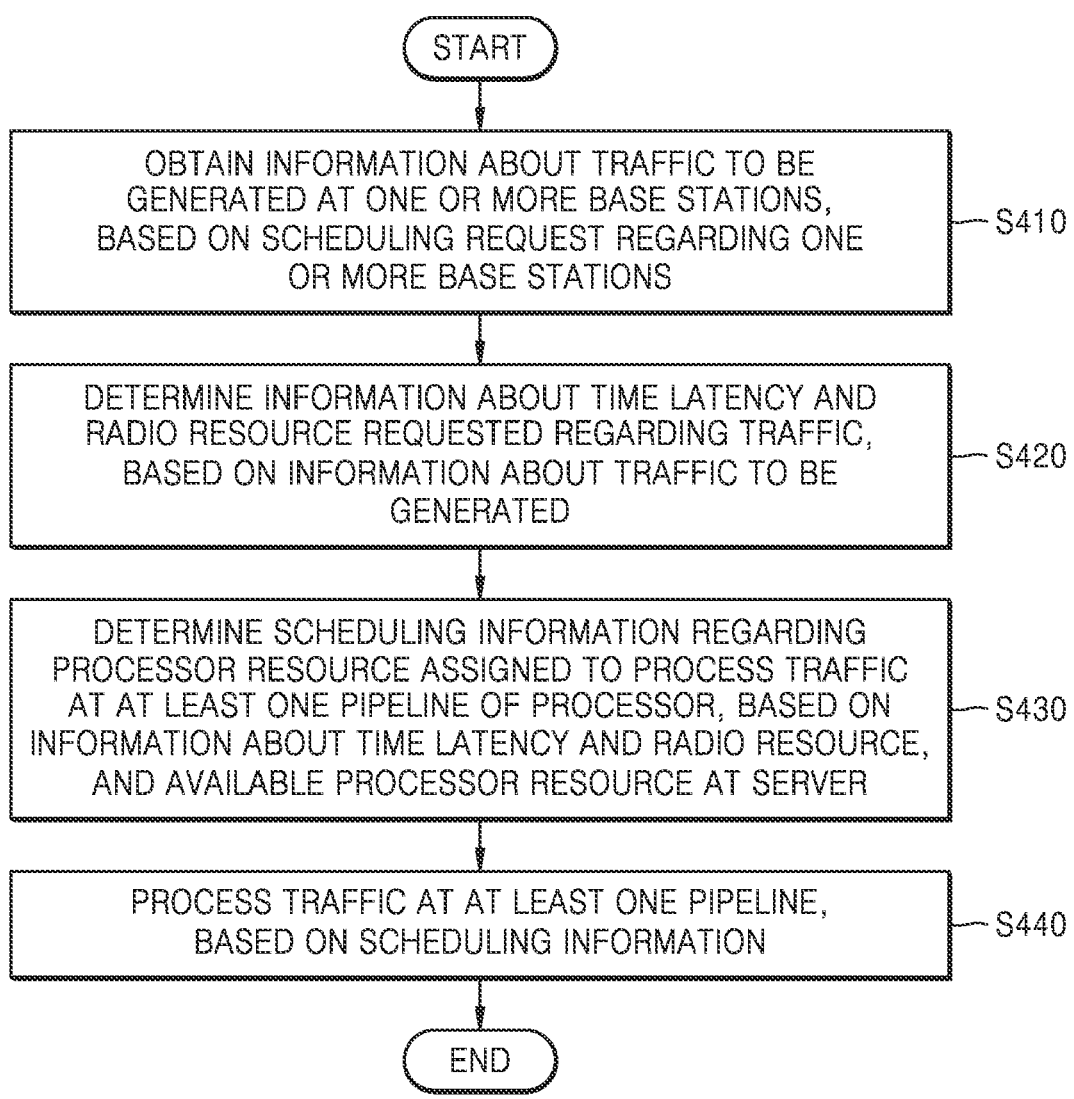
FIG. 4 is a flowchart of a method, performed by a virtualized RAN, of scheduling a processor resource, according to an embodiment of the disclosure.

FIG. 4 is a flowchart of a method, performed by a vRAN, of scheduling a processor resource, according to an embodiment of the disclosure.

Referring to FIG. 4, in operation S410, a server may obtain information about traffic to be generated at one or more base stations, based on a scheduling request regarding the one or more base stations.

The server may obtain the scheduling request transmitted from a plurality of terminals accessing the one or more base stations. The scheduling request may include a message requesting assignment of a time-frequency resource for the terminal to transmit the traffic via UL, and the scheduling request may include traffic information to be transmitted by the terminal. Specific examples of the traffic information may correspond to those described with reference to FIG. 3.

According to another embodiment of the disclosure, the server may receive, from a service server, the scheduling request including the traffic information to be transmitted, via a DL, to the plurality of terminals accessing the one or more base stations. The service server is a server providing traffic regarding a service used by the plurality of terminals accessing the one or more base stations, and for example, an origin server storing streaming content or the like may be included in the service server. However, this is only an example and the service server is not limited thereto.

In operation S420, the server may determine information about time latency and radio resource requested regarding the traffic, based on the information about the traffic to be generated.

The radio resource may include, for example, at least one of a time-frequency resource for transmission/reception of the traffic, a transmission/reception mode between the base stations and the terminal, the number of antenna ports, the number of layers, or channel coding and modulation techniques.

The server may determine information about the transmission/reception mode, the number of antenna ports, the number of layers, and the channel coding and modulation techniques, based on capability information of the terminal or a type of the terminal that requested scheduling or the terminal that is to receive the traffic. The capability information of the terminal may be obtained by the server via a configuration process between the terminal and the base station, such as RRC configuration. The time-frequency resource may also be assigned by the server to the terminal, according to an amount of traffic to be transmitted by the terminal via the UL, or the like.

The information about the time latency may vary depending on a type of a service that generated the traffic, a type of a device, and a type of a wireless communication system where the traffic is generated. For example, when the type of service that generated the traffic is a V2X service, the server may determine the information about the time latency of the traffic to be 1 ms.

In operation S430, the server may determine scheduling information regarding a processor resource assigned to process the traffic at at least one pipeline of a processor, based on the information about time latency and radio resource, and an available processor resource at the server.

The server may identify the available processor resource at the server, to process the traffic to be generated at the one or more base stations. For example, the server may obtain resource monitoring information regarding a processor resource used to process traffic generated before the scheduling request. The server may predict the processor resource required to process the traffic, based on the information about time latency and radio resource requested for the traffic to be generated, by using the resource monitoring information.

When the time latency requested regarding the traffic is less than a threshold value, the server according to an embodiment of the disclosure may determine the scheduling information such that all processor resources requested to process the traffic are assigned. When the time latency requested regarding the traffic is equal to or greater than the threshold value, the server according to another embodiment of the disclosure may determine the scheduling information such that a minimum processor resource of a pre-set size is assigned.

In operation S440, the server may process the traffic at the at least one pipeline, based on the scheduling information.

The server according to an embodiment of the disclosure may process the traffic after traffic pre-assigned to the at least one pipeline is processed, when a size of the processor resource assigned to the traffic exceeds a size of the available processor resource at the server. As another example, when the size of the processor resource assigned to the traffic is smaller than or equal to the size of the available processor resource at the server, the server may process the traffic at a new pipeline generated to process the traffic.

The server according to another embodiment of the disclosure may stop the processing of the pre-assigned traffic and process newly generated traffic, when the size of the processor resource assigned to the traffic exceeds the size of the available processor resource at the server and the processing of the traffic has a higher priority than the processing of the traffic pre-assigned to the at least one pipeline. The priority may be determined based on the information about the time latency, according to an embodiment of the disclosure. For example, when time latency requested by pre-assigned first traffic is 10 ms, whereas time latency requested by newly generated second traffic is 1 ms, the server may determine that the second traffic needs to be processed before the first traffic. When the processing of the pre-assigned traffic is stopped, the server may generate a new pipeline to process the traffic. As another example, the server may discard data regarding traffic stopped at an existing pipeline and process the newly generated traffic.

Figure 5:
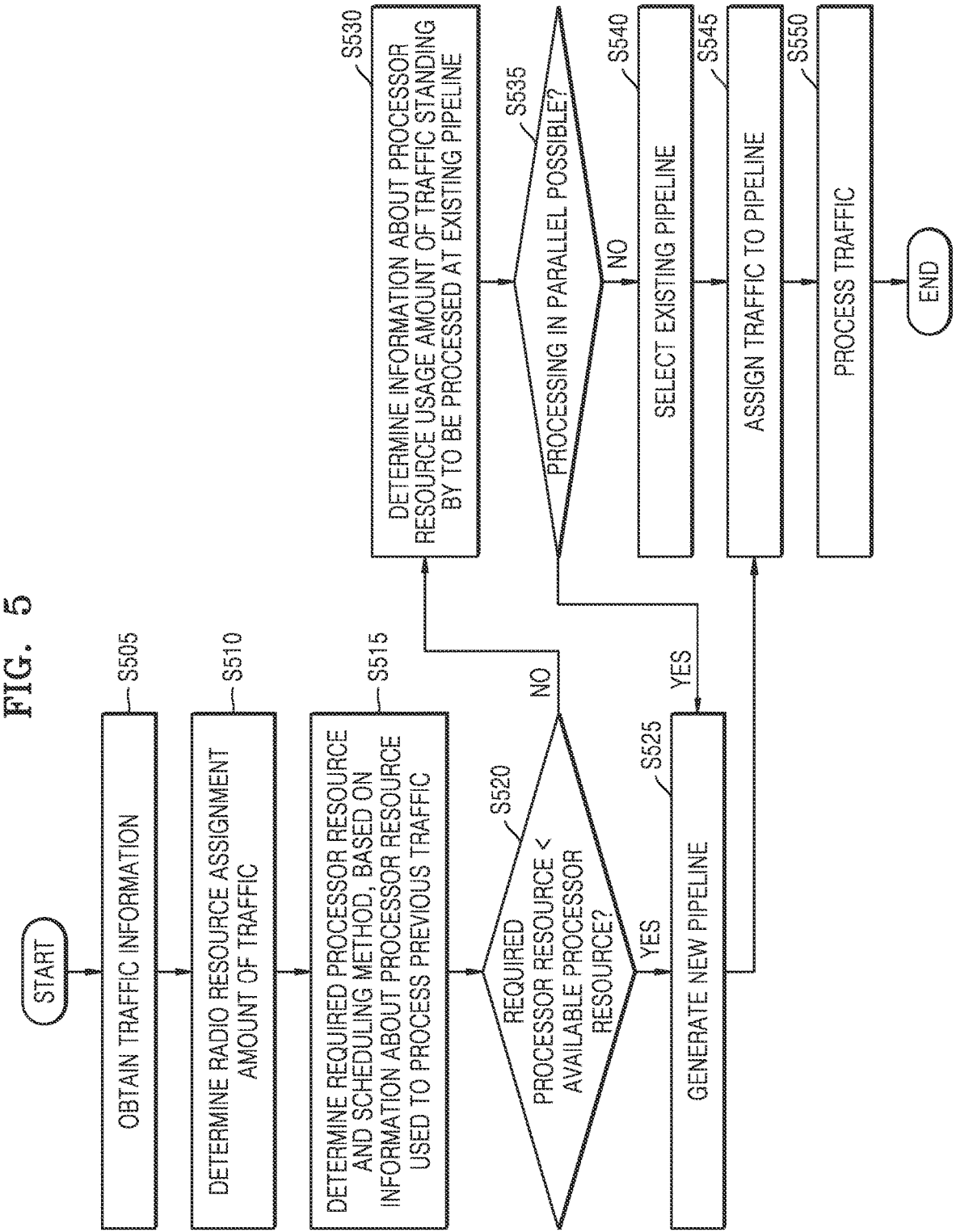
FIG. 5 is a flowchart of a method, performed by a virtualized RAN, of scheduling a processor resource, according to an embodiment of the disclosure.

FIG. 5 is a flowchart of a method, performed by a vRAN, of scheduling a processor resource, according to an embodiment of the disclosure.

Referring to FIG. 5, in operation S505, a server may obtain traffic information to be generated at one or more base stations. According to an embodiment of the disclosure, the server may obtain, as the traffic information, information about a type of service used by a terminal accessing the one or more base stations. However, this is only an example and the traffic information may correspond to that described in FIG. 3. According to another embodiment of the disclosure, the server may obtain information about a technique of a PHY layer used to transmit/receive traffic or obtain information about an amount of traffic to be generated. According to another embodiment of the disclosure, the server may obtain information about a specification requested to process traffic to be generated. For example, the server may obtain information about time latency requested for traffic.

In operation S510, the server may determine a radio resource assignment amount of the traffic, based on the traffic information. A radio resource is a resource affecting operation complexity of the PHY layer, and the radio resource assignment amount may increase in proportion to the complexity.

For example, when the type of service used by the terminal in operation S505 is a V2X service, the server may determine a radio resource assignment amount corresponding to the V2X service. In the V2X service, a length of a codeword of channel coding is increased to satisfy a low error rate, and thus a code rate may be set to be low. The server may determine the radio resource assignment amount, based on the operation complexity of the PHY layer when the traffic is transmitted/received by applying a code rate corresponding to requirements of the V2X service. However, this is only an example, and various PHY layer techniques may be used to determine the radio resource assignment amount. For example, in a case of a channel estimation process, the operation complexity of the PHY layer may increase in proportion to the number of symbols of a demodulation reference signal (DMRS), the number of antenna ports, the number of layers, and the number of user equipment (UEs), and thus the amount of radio resources to be assigned may increase in response thereto.

In operation S515, the server may determine a required processor resource and a scheduling method, based on information about a processor resource used to process previous traffic. For example, the server may determine a processor resource required to process the traffic to be generated, based on information about a processor resource used for each radio resource assignment amount of previously processed traffic. The processor resource required to process the traffic to be generated may be determined based on a proportion of CPU or GPU required from among entire CPU or GPU, the number of clock cycles required relative to maximum GPU clock cycles, and a memory size, but these are only examples and information indicating the processor is not limited thereto.

The server may also determine the scheduling method. First, the scheduling method may be classified by the information about time latency requested to process the traffic. For example, when requested time latency is less than A ms, the server may determine to perform scheduling according to a first method of assigning entire processor resources requested to process the traffic. Also, when the time latency requested for the traffic is equal to or greater than A ms, the server may determine to perform scheduling according to a second method of assigning a minimum processor resource of a pre-set size.

In operation S520, the server may determine whether a size of the required processor resource requested to process the traffic is smaller than a size of an available processor resource.

For example, when the scheduling method is determined to be the first method, the server may determine whether a size of the entire processor resources required to process the traffic is smaller than the size of the available processor resource. As another example, when the scheduling method is determined to be the second method, the server may determine whether the minimum processor resource of the pre-set size is smaller than the size of the available processor resource.

In operation S525, the server may generate a new pipeline.

The server may generate the new pipeline when it is determined that the size of the required processor resource determined according to the scheduling method is smaller than the size of the available processor resource, according to a result of the determining in operation S520.

In operation S530, the server may determine information about a processor resource usage amount of traffic standing by to be processed at an existing pipeline.

When it is determined that the size of the required processor resource determined according to the scheduling method is equal to or greater than the size of the available processor resource, according to the result of the determining in operation S520, the server may determine whether an available processor resource is able to be additionally secured. To verify whether an available processor resource is able to be additionally secured, the server may determine the information about the processor resource usage amount of traffic standing by to be processed at the existing pipeline.

In operation S535, the server may determine whether traffic is able to be processed in parallel, based on the processor resource usage amount of traffic standing by to be processed at the existing pipeline. The server may compare sizes of an updated available processor resource and a processor resource required for the traffic to be generated, when it is verified that the available processor resource that may be additionally secured is present, based on the processor resource usage amount of the traffic standing by to be processed at the existing pipeline. When the size of the processor resource required for the traffic to be generated is smaller than the size of the updated available processor resource, the server may determine that the traffic is able to be processed in parallel, and generate the new pipeline.

In operation S540, the server may select an existing pipeline when it is determined that the traffic is unable to be processed in parallel.

In operation S545, the server may assign the traffic to the pipeline.

According to an embodiment of the disclosure, when the server determined to assign the traffic to the existing pipeline, the server may compare priorities between the traffic standing by to be processed at the existing pipeline and the traffic to be generated. The server may determine the traffic to be assigned to the existing pipeline, based on a result of comparing the priorities. For example, when a limit on time latency of the traffic to be generated is stricter than a limit on time latency of the traffic standing by to be processed, the server may perform scheduling such that the traffic to be generated is processed before the traffic standing by. According to another embodiment of the disclosure, when the server has generated the new pipeline, the server may assign the traffic to the new pipeline.

In operation S550, the server may process the traffic.

When the server has assigned the traffic to the new pipeline, the traffic may be processed in parallel to existing traffic being processed. As another example, when the server has assigned the traffic to the existing pipeline, the traffic may be processed after the existing traffic being processed is processed. However, when the traffic has a higher priority than the existing traffic being processed due to a time latency limit or the like, the processing of the existing traffic may be stopped and the traffic may be processed.

Figure 6:
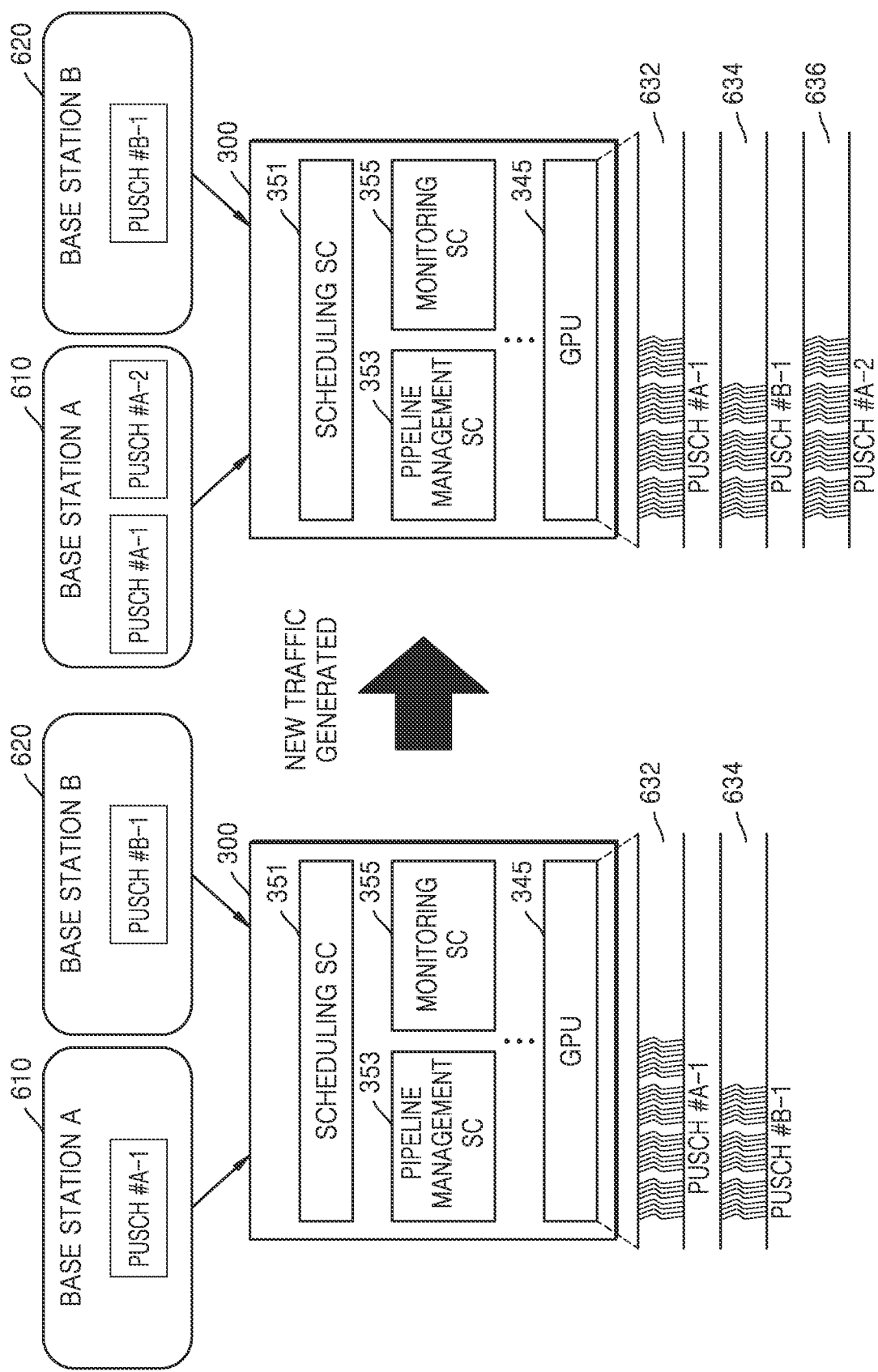
FIG. 6 is a diagram of a method, performed by a virtualized RAN, of scheduling a processor resource, according to an embodiment of the disclosure.

FIG. 6 is a diagram of a method, performed by a vRAN, of scheduling a processor resource, according to an embodiment of the disclosure.

Referring to FIG. 6, traffic may be generated at a plurality of base stations, i.e., a base station A 610 and a base station B 620. The traffic generated at the base station A 610 and the base station B 620 may be transmitted to the server 300. In the current embodiment of the disclosure, it is assumed that physical uplink shared channel (PUSCH) #A-1 generated at the base station A 610 and PUSCH #B-1 generated at the base station B 620 are processed by the server 300. A PUSCH corresponds to a UL channel for data transmission, but in the specification, the PUSCH is used to refer to traffic received therethrough, for convenience of description.

The server 300 may obtain, from the base station A 610, information about traffic, i.e., PUSCH #A-2, to be newly generated. When the server 300 obtains the information about the PUSCH #A-2, the scheduling SC 351 may determine information about time latency and radio resource requested for PUSCH #A-2. For example, the scheduling SC 351 may determine that a time/frequency axis resource assignment amount of PUSCH #A-2 corresponds to 8 resource blocks (RBs), and the number of layers is 2. Also, the scheduling SC 351 may determine that a time latency limit of PUSCH #A-2 is X ms.

The scheduling SC 351 may predict a processor resource required to process traffic, based on the information about time latency and radio resource requested for the traffic to be generated, by using resource monitoring information. The resource monitoring information may be generated as a result of monitoring a processor resource used when the monitoring SC 355 processes previous traffic, and may include information about a processor resource used based on a radio resource assignment amount.

When time latency requested for PUSCH #A-2 is less than a threshold value, the scheduling SC 351 may assign entire processor resources required to process PUSCH #A-2. The scheduling SC 351 may also determine whether a size of the required entire processor resources is smaller than a size of an available processor resource at the GPU 345. When the size of the required entire processor resources is smaller than the size of the available processor resource at the GPU 345, the scheduling SC 351 may determine to generate a pipeline. According to the determination of the scheduling SC 351, the pipeline management SC 353 generates a new pipeline 636, and PUSCH #A-2 may be assigned to the new pipeline 636. Accordingly, PUSCH #A-2 may be processed in parallel to PUSCH #A-1 and PUSCH #B-1 that are being processed at existing pipelines 632 and 634.

Figure 7:
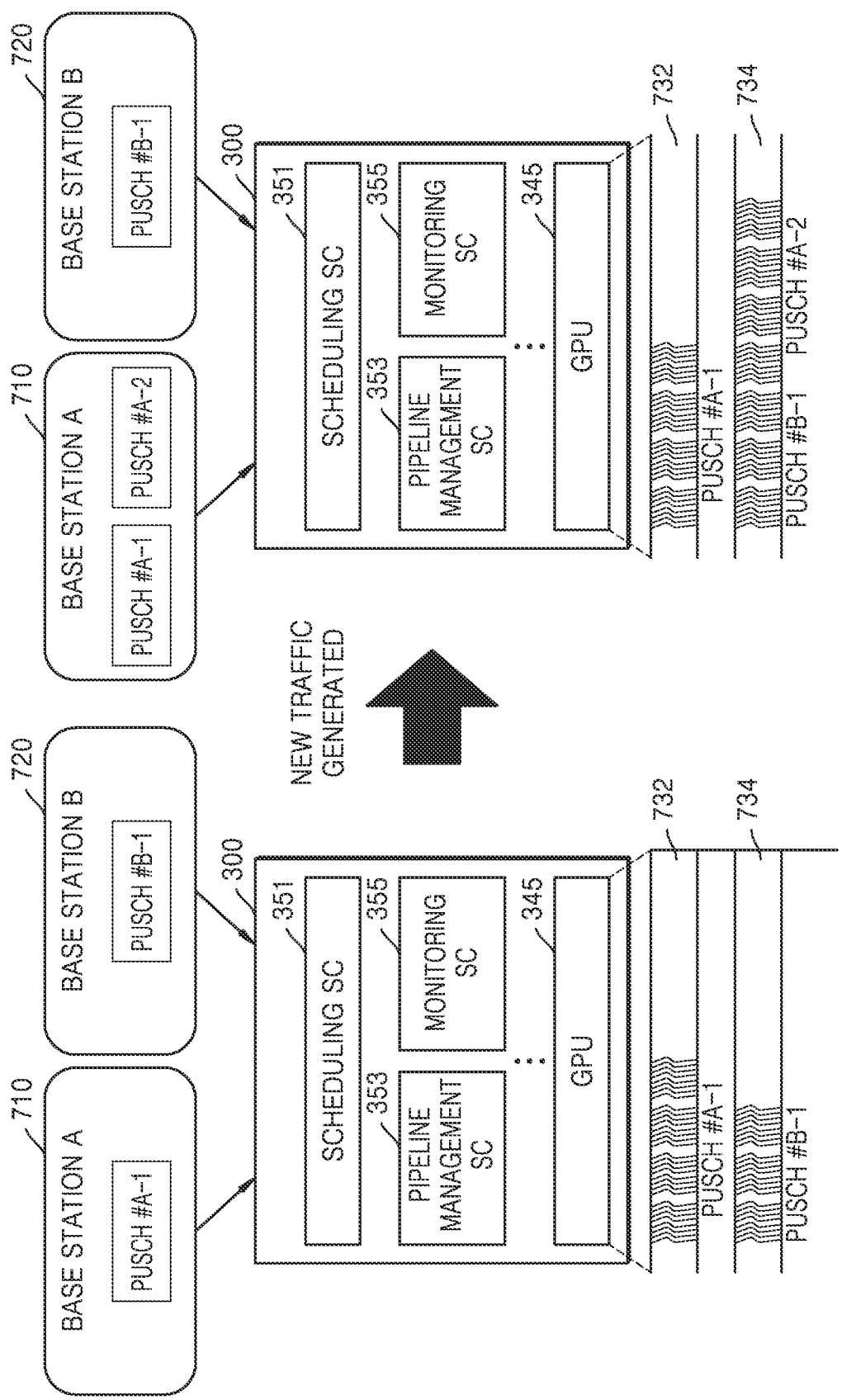
FIG. 7 is a diagram of a method, performed by a virtualized RAN, of scheduling a processor resource, according to an embodiment of the disclosure.

FIG. 7 is a diagram of a method, performed by a vRAN, of scheduling a processor resource, according to an embodiment of the disclosure.

Referring to FIG. 7, traffic may be generated at a plurality of base stations, i.e., a base station A 710 and a base station B 720. The traffic generated at the base station A 710 and the base station B 720 may be transmitted to the server 300. In the embodiment illustrated in FIG. 7, it is assumed that PUSCH #A-1 generated at the base station A 710 and PUSCH #B-1 generated at the base station B 720 are processed by the server 300.

The server 300 may obtain, from the base station A 710, information about traffic, i.e., PUSCH #A-2, to be newly generated. When the server 300 obtains the information about the PUSCH #A-2, the scheduling SC 351 may determine information about time latency and radio resource requested for PUSCH #A-2. For example, the scheduling SC 351 may determine that a time/frequency axis resource assignment amount of PUSCH #A-2 corresponds to 8 RBs, and the number of layers is 2. Also, the scheduling SC 351 may determine that a time latency limit of PUSCH #A-2 is Y ms.

The scheduling SC 351 may predict a processor resource required to process traffic, based on the information about time latency and radio resource requested for the traffic to be generated, by using resource monitoring information. The resource monitoring information may be generated as a result of monitoring a processor resource used when the monitoring SC 355 processes previous traffic, and may include information about a processor resource used based on a radio resource assignment amount.

When time latency requested for PUSCH #A-2 is less than a threshold value, the scheduling SC 351 may assign entire processor resources required to process PUSCH #A-2. The scheduling SC 351 may also determine whether a size of the required entire processor resources is smaller than a size of an available processor resource at the GPU 345. When the size of the required entire processor resources is smaller than the size of the available processor resource at the GPU 345, the scheduling SC 351 may determine to assign PUSCH #A-2 to an existing pipeline. According to the determination of the scheduling SC 351, the pipeline management SC 353 may assign PUSCH #A-2 to a second pipeline 734 among existing pipelines 732 and 734. A criterion for determining a pipeline to which traffic is to be assigned from among existing pipelines may be an amount of traffic standing by to be processed at the existing pipelines, but this is only an example and the criterion is not limited thereto. PUSCH #A-2 may be processed after processing of PUSCH #B-1 being processed at the second pipeline 734 is completed.

Figure 8:
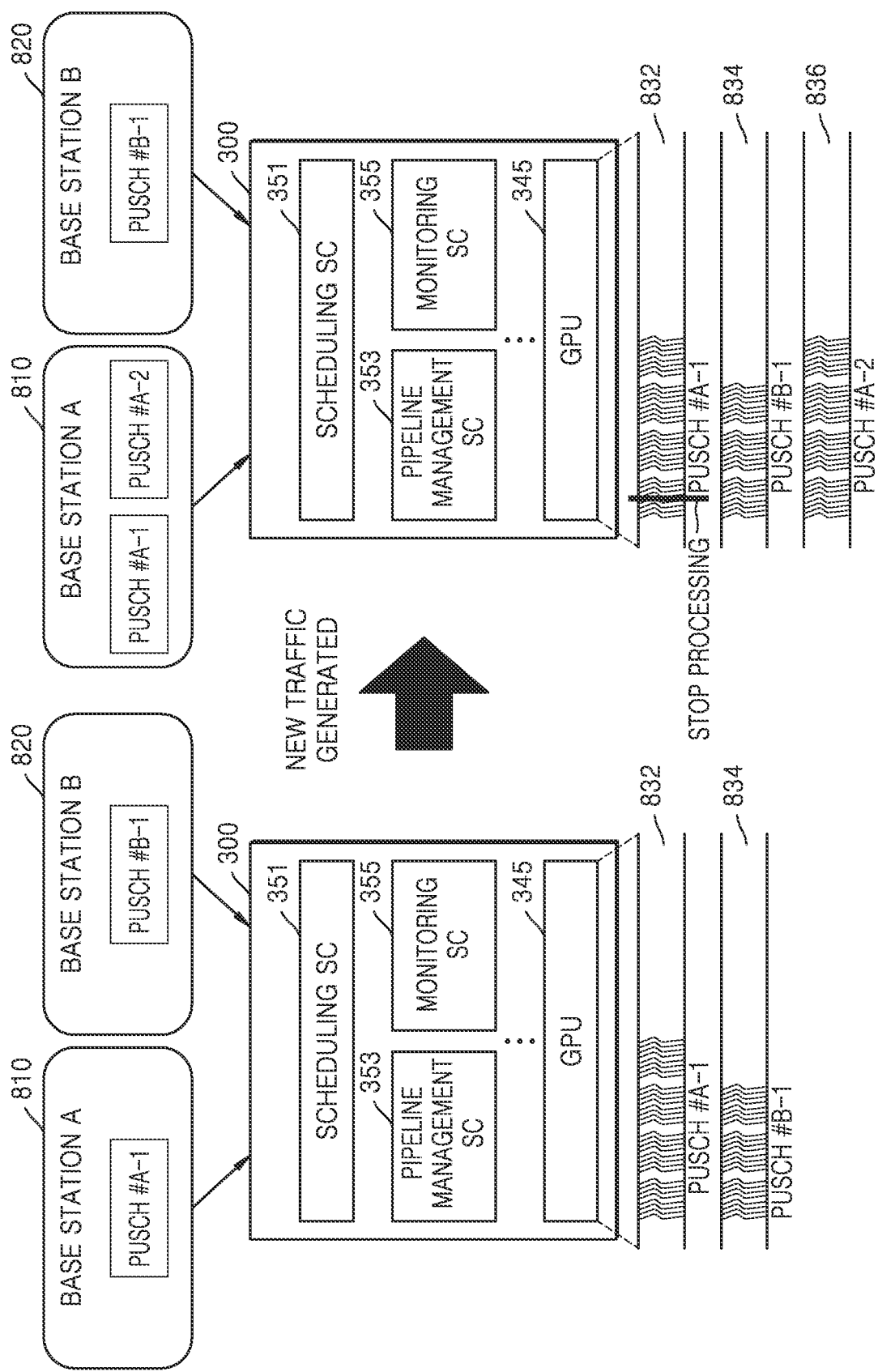
FIG. 8 is a diagram of a method, performed by a virtualized RAN, of scheduling a processor resource, according to an embodiment of the disclosure.

FIG. 8 is a diagram for describing a method, performed by a vRAN, of scheduling a processor resource, according to an embodiment of the disclosure.

Referring to FIG. 8, traffic may be generated at a plurality of base stations, i.e., a base station A 810 and a base station B 820. The traffic generated at the base station A 810 and the base station B 820 may be transmitted to the server 300. In the current embodiment of the disclosure, it is assumed that PUSCH #A-1 generated at the base station A 810 and PUSCH #B-1 generated at the base station B 820 are processed by the server 300.

The server 300 may obtain, from the base station A 810, information about traffic, i.e., PUSCH #A-2, to be newly generated. When the server 300 obtains the information about the PUSCH #A-2, the scheduling SC 351 may determine information about time latency and radio resource requested for PUSCH #A-2. For example, the scheduling SC 351 may determine that a time/frequency axis resource assignment amount of PUSCH #A-2 corresponds to 8 RBs, and the number of layers is 2. The scheduling SC 351 may also determine that a time latency limit of PUSCH #A-2 is Y ms.

The scheduling SC 351 may predict a processor resource required to process traffic, based on the information about time latency and radio resource requested for the traffic to be generated, by using resource monitoring information. The resource monitoring information may be generated as a result of monitoring a processor resource used when the monitoring SC 355 processes previous traffic, and may include information about a processor resource used based on a radio resource assignment amount.

When time latency requested for PUSCH #A-2 is less than a threshold value, the scheduling SC 351 may assign entire processor resources required to process PUSCH #A-2. The scheduling SC 351 may also determine whether a size of the required entire processor resources is smaller than a size of an available processor resource at the GPU 345. When the size of the required entire processor resources is smaller than the size of the available processor resource at the GPU 345, the scheduling SC 351 may determine to assign PUSCH #A-2 to an existing pipeline.

The scheduling SC 351 may also compare priorities of PUSCH #A-1 and PUSCH #B-1 being processed at the existing pipeline, and PUSCH #A-2 to be newly generated. An example of a criterion for determining a priority may include a time latency limit. When a time latency limit of PUSCH #A-2 is shorter than a time latency limit of PUSCH #A-1, the scheduling SC 351 may stop processing of PUSCH #A-1. When the processing of PUSCH #A-1 is stopped, an additional available processor resource is obtained and thus the scheduling SC 351 may determine to generate a new pipeline 836. Accordingly, the pipeline management SC 353 may generate the new pipeline 836 and assign PUSCH #A-2 to the new pipeline 836. Thus, PUSCH #A-2 may be processed in parallel to PUSCH #B-1 that is being processed at an existing pipeline 834.

Figure 9:
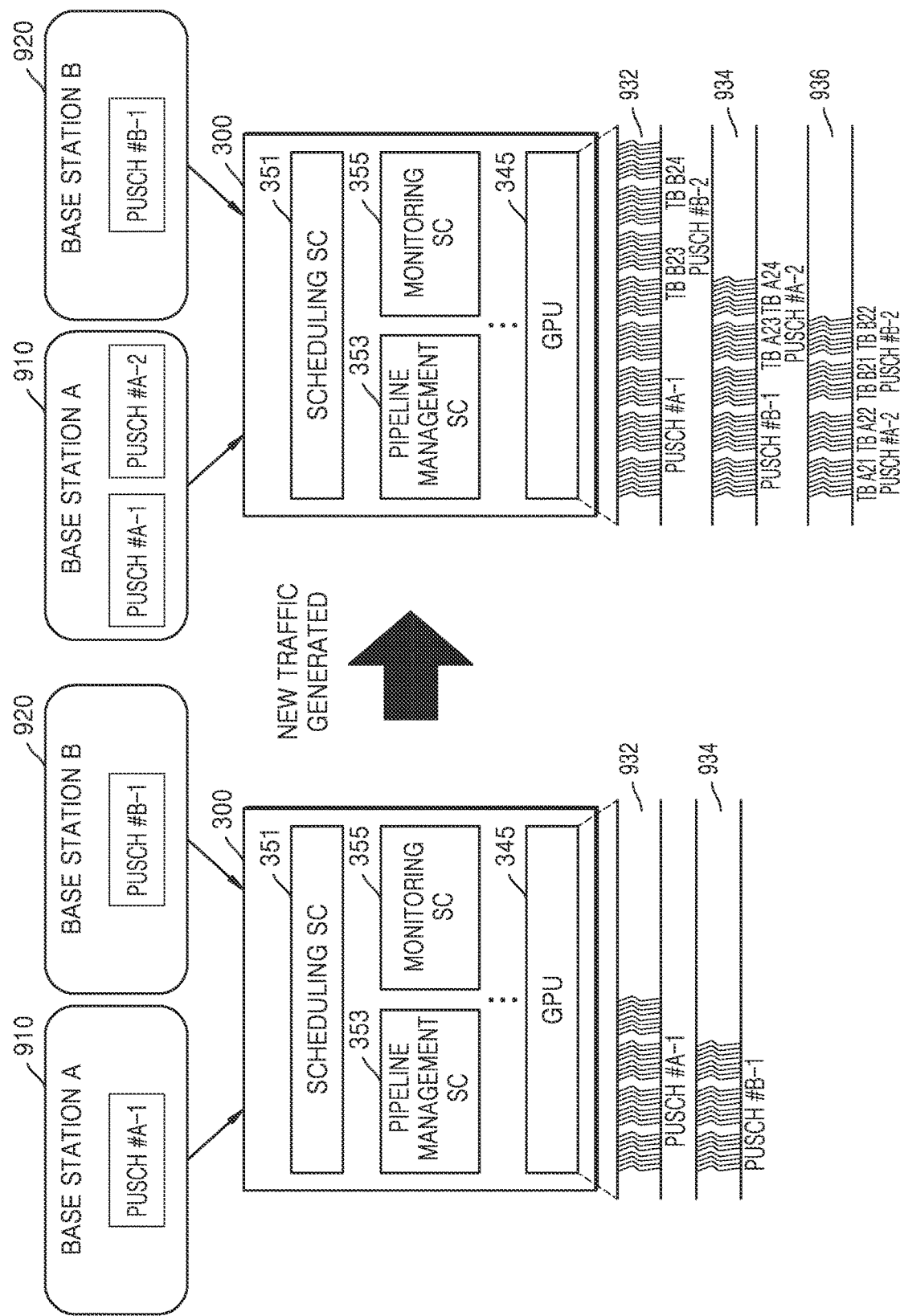
FIG. 9 is a diagram of a method, performed by a virtualized RAN, of scheduling a processor resource, according to an embodiment of the disclosure.

FIG. 9 is a diagram of a method, performed by a vRAN, of scheduling a processor resource, according to an embodiment of the disclosure.

Referring to FIG. 9, traffic may be generated at a plurality of base stations, i.e., a base station A 910 and a base station B 920. The traffic generated at the base station A 910 and the base station B 920 may be transmitted to the server 300. In the embodiment illustrated in FIG. 9, it is assumed that PUSCH #A-1 generated at the base station A 910 and PUSCH #B-1 generated at the base station B 920 are processed by the server 300. A PUSCH corresponds to a UL channel for data transmission, but in the specification, the PUSCH is used to refer to traffic received therethrough, for convenience of description.

The server 300 may obtain information about traffic PUSCH #A-2 that is to be newly generated from the base station A 910, and about traffic PUSCH #B-2 that is to be newly generated from the base station B 920. When the server 300 obtains the information about the PUSCH #A-2 and PUSCH #B-2, the scheduling SC 351 may determine information about time latency and radio resource requested for PUSCH #A-2 and PUSCH #B-2. For example, the scheduling SC 351 may determine that a time/frequency axis resource assignment amount of PUSCH #A-2 corresponds to 8 RBs and the number of layers is 2, and that a time/frequency axis resource assignment amount of PUSCH #B-2 corresponds to 8 RBs and the number of layers is 4. Also, the scheduling SC 351 may determine that a time latency limit of PUSCH #A-2 is M ms and a time latency limit of PUSCH #B-2 is N ms.

The scheduling SC 351 may predict a processor resource required to process traffic, based on the information about time latency and radio resource requested for the traffic to be generated, by using resource monitoring information. The resource monitoring information may be generated as a result of monitoring a processor resource used when the monitoring SC 355 processes previous traffic, and may include information about a processor resource used based on a radio resource assignment amount.

When time latency requested for PUSCH #A-2 is equal to or greater than a threshold value, the scheduling SC 351 may assign a minimum processor resource of a pre-set size. Also, when time latency requested for PUSCH #B-2 is equal to or greater than a threshold value, the scheduling SC 351 may assign a minimum processor resource of a pre-set size. The scheduling SC 351 may determine whether a size of the minimum processor resource required to be assigned for PUSCH #A-2 and PUSCH #B-2 is smaller than a size of an available processor resource at the GPU 345. When the size of the minimum processor resource required to be assigned for PUSCH #A-2 and PUSCH #B-2 is smaller than the size of the available processor resource at the GPU 345, the scheduling SC 351 may determine to generate a pipeline. According to the determination of the scheduling SC 351, the pipeline management SC 353 may generate a new pipeline 936, and the minimum processor resource of the pre-set size may be assigned at the new pipeline 936 for PUSCH #A-2 and PUSCH #B-2. The minimum processor resource of PUSCH #A-2 and PUSCH #B-2 assigned to the new pipeline 936 may be processed in parallel to PUSCH #A-1 and PUSCH #B-1 being processed at existing pipelines 932 and 934.

FIG. 9 illustrates that remaining processor resources excluding the minimum processor resource of the pre-set size for PUSCH #A-2 and PUSCH #B-2 are assigned to the existing pipelines 932 and 934, but this is only an example and the remaining processor resources may also be assigned to the new pipeline 936.

Figure 10:
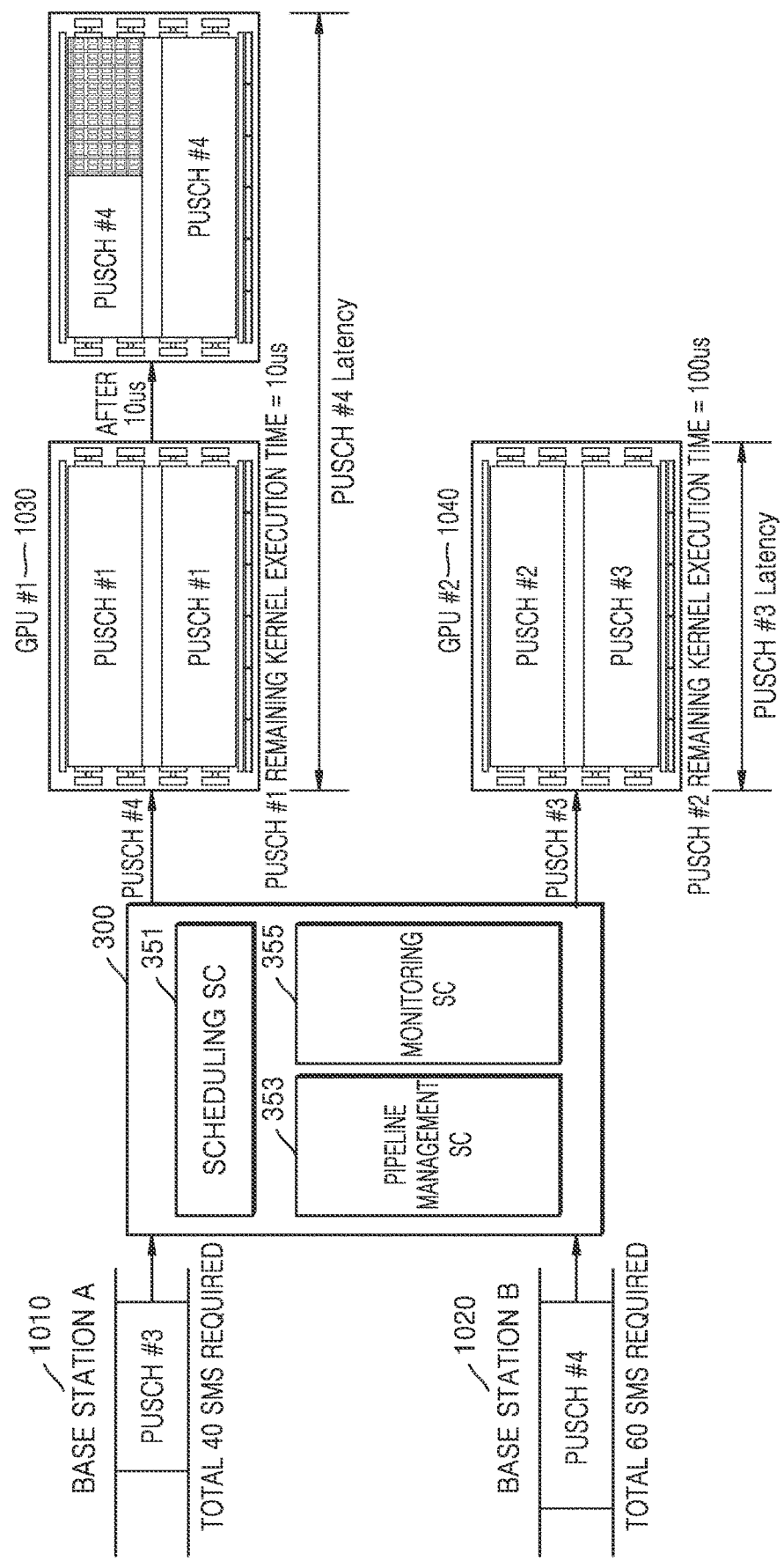
FIG. 10 is a diagram of time latency having occurred during traffic processing in a virtualized RAN, according to an embodiment of the disclosure.

FIG. 10 is a diagram for describing time latency having occurred during traffic processing in a vRAN, according to an embodiment of the disclosure.

Referring to FIG. 10, the server 300 may obtain traffic information from each of a base station A 1010 and a base station B 1020. For example, the server 300 may obtain information about PUSCH #3 and PUSCH #4 respectively from the base station A 1010 and base station B 1020.

When the server 300 obtains the information about the PUSCH #3 and PUSCH #4, the scheduling SC 351 may determine information about time latency and radio resource requested for PUSCH #3 and PUSCH #4. For example, the scheduling SC 351 may determine a radio resource assignment amount, based on lengths of codewords used for channel coding of PUSCH #3 and PUSCH #4, the number of symbols configuring DMRS used for channel estimation, the number of data symbols used for channel equalization, and the number of layers. Also, the scheduling SC 351 may determine that a time latency limit of PUSCH #3 is 10 μs and a time latency limit of PUSCH #4 is 50 μs.

The scheduling SC 351 may predict a processor resource required to process traffic, based on information about time latency and radio resource requested for traffic to be generated, by using resource monitoring information obtained from the monitoring SC 355. The scheduling SC 351 may determine a scheduling method by determining whether time latency requested for each of PUSCH #3 and PUSCH #4 is less than a threshold value. In the embodiment illustrated in FIG. 10, it is assumed that the time latency requested for each of PUSCH #3 and PUSCH #4 is less than the threshold value. In this case, the scheduling SC 351 may assign entire processor resources requested for processing of each of PUSCH #3 and PUSCH #4.

Also, the scheduling SC 351 may determine whether sizes of processor resources required to be assigned for PUSCH #3 and PUSCH #4 are smaller than a size of an available processor resource at a GPU. For example, the sizes of processor resources required to be assigned for PUSCH #3 and PUSCH #4 may be respectively determined to be 40 stream multiprocessors (SMs) and 60 SMs. An SM may include a plurality of cores performing a program code to process traffic, at least one cache memory, and a plurality of registers.

When the size of the required processor resource is smaller than the size of the available processor resource, the scheduling SC 351 may determine to generate a pipeline. At the server 300, processes may be performed on pre-assigned PUSCH #1 and PUSCH #2, and remaining processor resources excluding processor resources used to process PUSCH #1 and PUSCH #2 from among entire processor resources may be determined as available processor resources. In the embodiment illustrated in FIG. 10, it is assumed that the required processor resource for PUSCH #3 and the required processor resource for PUSCH #4 are each smaller than the size of the available processor resources, but the total size of the required processor resources is greater than the size of the available processor resources. Accordingly, the scheduling SC 351 may select traffic having a relatively short time latency limit from among PUSCH #3 and PUSCH #4, and perform scheduling such that the selected traffic is first processed. For example, the scheduling SC 351 may select PUSCH #3 from among PUSCH #3 having the time latency limit of 10 μs and PUSCH #4 having the time latency limit of 50 μs.

According to the determination of the scheduling SC 351, the pipeline management SC 353 may generate a new pipeline at a GPU #2 1040 where an available processor resource is present, from among GPU #1 1030 and the GPU #2 1040. Also, the PUSCH #3 may be assigned to the new pipeline, and PUSCH #3 may be processed in parallel to PUSCH #2. Meanwhile, the scheduling SC 351 may assign PUSCH #4 to a pipeline of the GPU #1 1030. A remaining processing time of PUSCH #1 assigned to the GPU #1 1030 is 10 μs, whereas a remaining processing time of PUSCH #2 is 100 μs, and thus the scheduling SC 351 may assign PUSCH #4 to the pipeline of GPU #1 1030 having a relatively short remaining processing time. PUSCH #4 may be processed at the pipeline of GPU #1 1030 after PUSCH #1 is processed.

Figure 11:
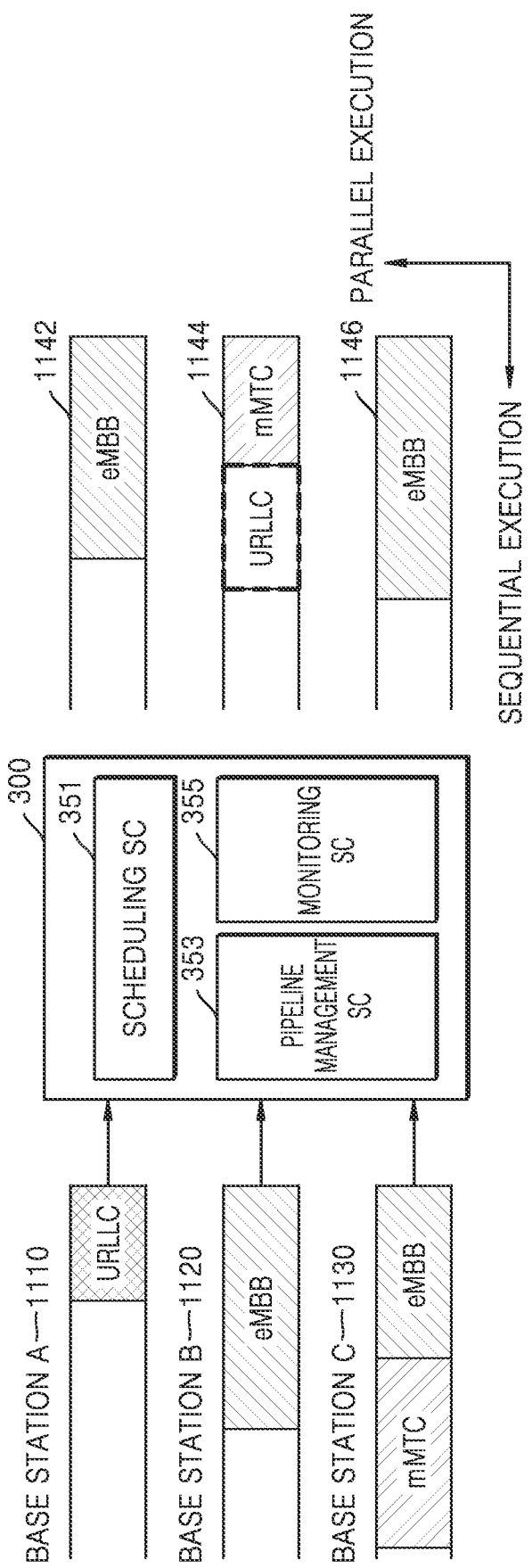
FIG. 11 is a diagram of a method, performed by a virtualized RAN, of scheduling a processor resource for processing traffic having different time latency limits, according to an embodiment of the disclosure.

FIG. 11 is a diagram for describing a method, performed by a vRAN, of scheduling a processor resource for processing traffic having different time latency limits, according to an embodiment of the disclosure.

Referring to FIG. 11, the server 300 may obtain traffic information from a plurality of base stations, i.e., a base station A 1110, a base station B 1120, and a base station C 1130. For example, the server 300 may obtain, as traffic information, information about a type of service that generated traffic. The scheduling SC 351 in the server 300 may verify, via the obtained information, that traffic generated by a URLLC service is to be received from the base station A 1110, traffic generated by an eMBB service is to be received from the base station B 1120, and traffic generated by an mMTC service and eMBB service is to be received from the base station C 1130. In the current embodiment of the disclosure, the traffic generated by the eMBB service will be referred to as eMBB traffic, the traffic generated by the mMTC service will be referred to as mMTC traffic, and the traffic generated by the URLLC service will be referred to as URLLC traffic, for convenience of description.

The scheduling SC 351 may determine information about time latency and radio resource requested regarding the eMBB traffic, mMTC traffic, and URLLC traffic. For example, the scheduling SC 351 may determine a radio resource assignment amount, based on requirements (for example, a data rate, an error rate, or connectivity) of the eMBB traffic, mMTC traffic, and URLLC traffic. Also, the scheduling SC 351 may determine information about time latency of the eMBB traffic, mMTC traffic, and URLLC traffic.

The scheduling SC 351 may predict a processor resource required to process traffic, based on information about time latency and radio resource requested for traffic to be generated, by using resource monitoring information obtained from the monitoring SC 355. The scheduling SC 351 may determine a scheduling method by determining whether time latency requested for each of eMBB traffic, mMTC traffic, and URLLC traffic is less than a threshold value.

When the time latency of URLLC traffic is less than the threshold value, the scheduling SC 351 may determine scheduling information such that all processor resources required to process the URLLC traffic are assigned to pipelines 1142, 1144, and 1146. When the time latency of each of eMBB traffic and mMTC traffic is equal to or greater than the threshold value, the scheduling SC 351 may also determine scheduling information such that a minimum processor resource of a pre-set size is assigned to the pipelines 1142, 1144, and 1146.

The scheduling SC 351 may also determine whether sizes of processor resources required to be assigned for URLLC traffic, eMBB traffic, and mMTC traffic are smaller than a size of an available processor resource at a GPU. When the total size of processor resources required to process the URLLC traffic, eMBB traffic, and mMTC traffic is greater than the size of available processor resource at the GPU, the scheduling SC 351 may select traffic to be processed in parallel, in consideration of a time latency limit of each traffic. For example, the time latency limits of URLLC traffic and eMBB traffic are relatively shorter than the time latency limit of mMTC traffic, and thus the scheduling SC 351 may schedule the mMTC traffic to be processed after processing of any one of URLLC traffic and eMBB traffic is completed. In this case, because a processing time of the URLLC traffic is relatively shorter than a processing time of the eMBB traffic, the scheduling SC 351 may determine to assign the mMTC traffic to the pipeline 1144 where the URLLC traffic is assigned. Accordingly, the pipeline management SC 353 may assign the mMTC traffic to the pipeline 1144, and the mMTC traffic may be processed after the URLLC traffic is processed.

Figure 12:
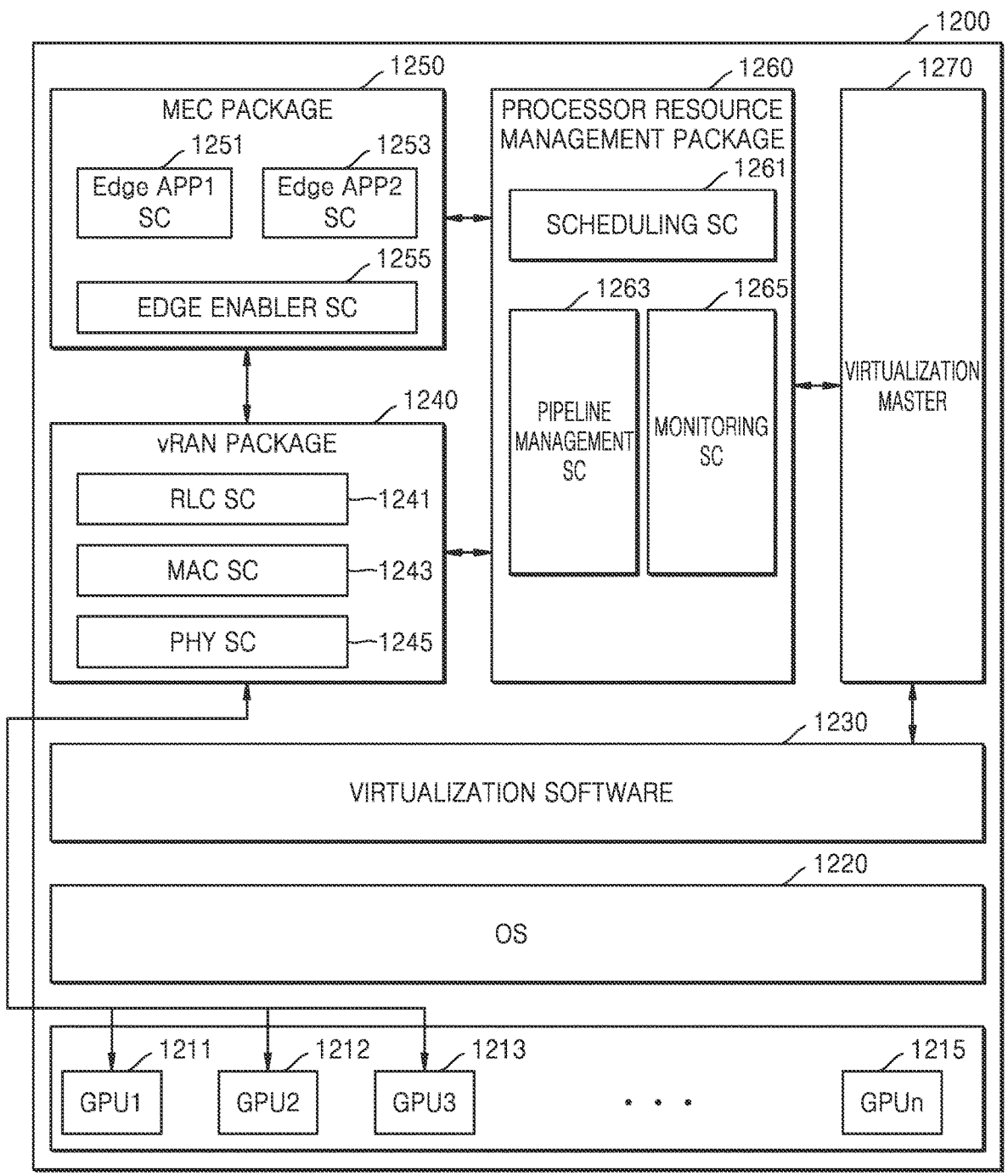
FIG. 12 is a diagram of a virtualized RAN that schedules a processor resource, according to an embodiment of the disclosure.

FIG. 12 is a diagram of a vRAN that schedules a processor resource, according to an embodiment of the disclosure.

Referring to FIG. 12, a server 1200 may include hardware 1210 capable of driving software for performing a vRAN function. In the embodiment illustrated in FIG. 12, the server 1200 may include, in addition to a GPU, a CPU, RAM, a storage, and an NIC, but for convenience of description, components other than a GPU are omitted. In the embodiment illustrated in FIG. 12, a plurality of GPUs 1211 through 1215 are included in the server 1200, but this is only an example and the server 1200 may include one GPU. The server 1200 may also include an OS 1220, virtualization software 1230, and virtualization master 1270.

Among components included in the server 1200 of FIG. 12, descriptions about components having same functions as those of the server 300 described in FIG. 3 are omitted.

A vRAN package 1240 may obtain a scheduling request regarding one or more base stations. The scheduling request may be obtained when a terminal requests assignment of a time-frequency resource to transmit traffic to a base station via a UL, according to an embodiment of the disclosure, or obtained for a service server to provide traffic information to be transmitted via a DL to a plurality of terminals accessing the base station, according to another embodiment of the disclosure. The vRAN package 1240 may include an RLC SC 1241, a MAC SC 1243, and a PHY SC 1245.

Among traffic transmitted to the vRAN package 1240, traffic generated due to execution of an application using a mobile edge computing (MEC) service may be transmitted to an MEC package 1250. The MEC package 1250 may execute an edge application, and process traffic generated due to execution of the edge application or traffic received in relation to the edge application. The edge application may be executed on an edge data network, wherein the edge data network may be arranged inside a base station of a 3GPP network to which a terminal is connected or at a location geographically close to the base station, and provide content at least partially identical to content provided by an external server. Traffic not using the MEC service from among the traffic transmitted to the vRAN package 1240 may be transmitted to another server outside the server 1200, and descriptions about a method of processing traffic by the other server outside the server 1200 are not provided in the disclosure.

The MEC package 1250 may include an edge enabler SC 1255 and a plurality of edge app SCs 1251 and 1253. The plurality of edge app SCs 1251 and 1253 are applications provided a third party in the edge data network providing the MEC service to the terminal, and may form a data session with an application client to transmit/receive data related to the application client. The edge enabler SC 1255 may provide a service to edge applications included in the edge data network, and provide information about the MEC service.

A scheduling SC 1261 may determine information about time latency and radio resource requested regarding traffic, based on information about the traffic received from the vRAN package 1240. The scheduling SC 1261 may determine scheduling information regarding a processor resource assigned to process the traffic at at least one pipeline of the GPUs 1211 to 1215, based on the information about time latency and radio resource, and an available processor resource at the server 1200. The server 1200 may identify the available processor resource at the server 1200, to process traffic to be generated at the one or more base stations.

The scheduling SC 1261 may obtain, from a GPU monitoring SC 1265, resource monitoring information regarding a processor resource used to process traffic generated before the scheduling request. The scheduling SC 1261 may predict a processor resource required to process traffic, based on the information about time latency and radio resource requested for the traffic to be generated, by using the resource monitoring information.

When the time latency requested regarding the traffic is less than a threshold value, the scheduling SC 1261 may determine the scheduling information such that all processor resources requested to process the traffic are assigned. As another example, when the time latency requested regarding the traffic is equal to or greater than the threshold value, the scheduling SC 1261 may determine the scheduling information such that a minimum processor resource of a pre-set size is assigned.

When a size of the processor resource assigned to the traffic exceeds a size of the available processor resource at the server 1200, the scheduling SC 1261 may identify a size of traffic standing by to be processed at the MEC package

1250. When it is determined that it is possible to reduce a processor resource assigned for the MEC package 1250, as a result of identifying the size of the traffic standing by at the MEC package 1250, the scheduling SC 1261 may reduce the existing processor resource assigned to the MEC package 1250.

Accordingly, an available processor resource is additionally secured, and thus a pipeline management SC 1263 may generate a new pipeline. The pipeline management SC 1263 may newly generate a pipeline or maintain an existing pipeline, based on the scheduling information received from the scheduling SC 1261. The pipeline management SC 1263 may also provide, to a PHY SC 1245, information about a pipeline at which the traffic to be generated is to be processed, based on the scheduling information.

The GPU monitoring SC 1265 may monitor the processor resource used to process the traffic, and store monitored information. The GPU monitoring SC 1265 may provide, to the scheduling SC 1261, the resource monitoring information regarding the processor resource used to process the traffic generated before the scheduling request.

Figure 13:
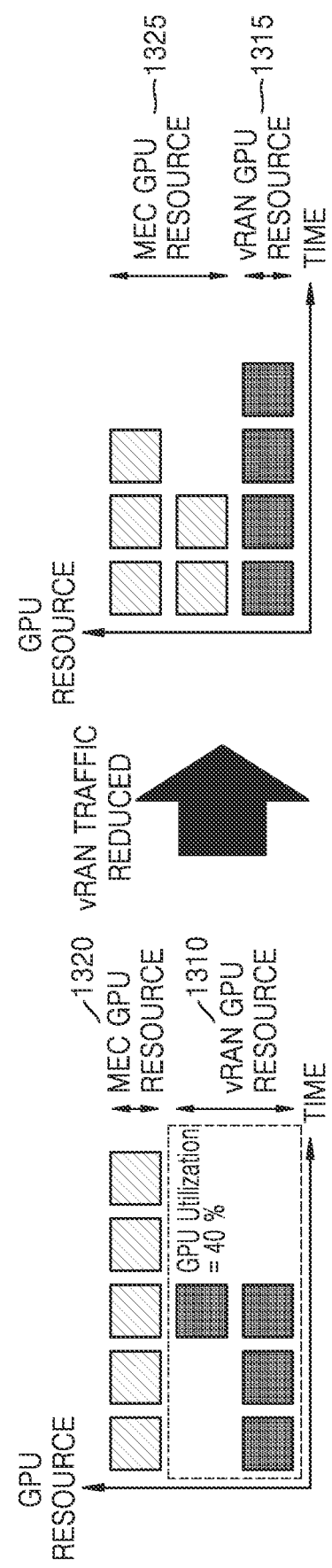
FIG. 13 is a diagram of a method, performed by a server, of scheduling a processor resource, based on traffic to be generated at a mobile edge computing (MEC) package and a virtualized RAN package, according to an embodiment of the disclosure.

FIG. 13 is a diagram of a method, performed by a server, of scheduling a processor resource, based on traffic to be generated at an MEC package and a vRAN package, according to an embodiment of the disclosure.

Referring to FIG. 13, the server may identify sizes of a vRAN GPU resource 1310 assigned for a current vRAN package and an MEC GPU package 1320 assigned for an MEC package. Also, the server may obtain information about traffic to be generated at the vRAN package and traffic to be generated at the MEC package.

The server may identify that the traffic to be generated at the vRAN package is to be reduced compared to traffic being currently processed, based on the obtained information. In this regard, the server may estimate that only 40% of GPU resources assigned for the current vRAN package are to be used, and accordingly, adjust GPU resources assigned for the vRAN package and MEC package. For example, upon estimating that the traffic to be generated at the vRAN package is to be reduced, the server may reduce the size of vRAN GPU resource 1310 assigned for the vRAN package. The server may process the traffic generated at the vRAN package and the MEC package, respectively via an adjusted vRAN GPU resource 1315 and an adjusted MEC GPU resource 1325.

Figure 14:
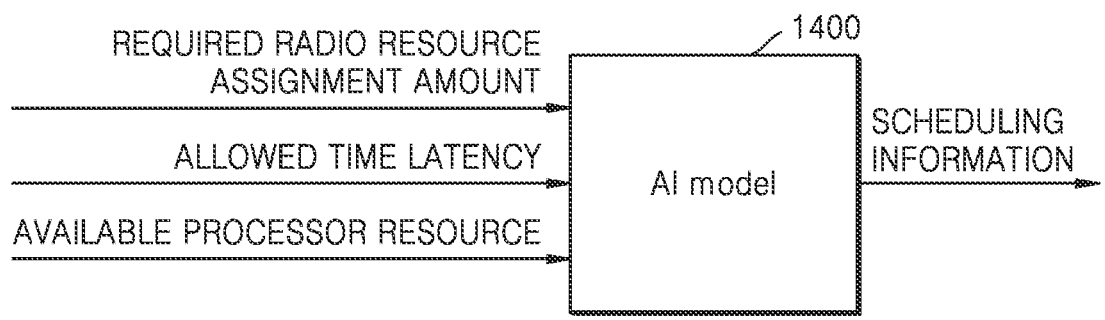
FIG. 14 is a diagram of an artificial intelligence (AI) model used by a virtualized RAN to schedule a processor resource, according to an embodiment of the disclosure.

FIG. 14 is a diagram of an artificial intelligence (AI) model 1400 used by a vRAN to schedule a processor resource, according to an embodiment of the disclosure.

Referring to FIG. 14, as input data, information about a required radio resource assignment amount, allowed time latency, and available processor resource may be applied to the AI model 1400. The server described with reference to FIG. 13 may train the AI model 1400, based on a result of comparing evaluation data and output data obtained as a result of applying the input data to the AI model 1400. For example, the server may apply various types of input data to the AI model 1400 until a difference between the evaluation data and the output data is less than a pre-set threshold value. As another example, the server may train the AI model 1400 by applying, to the AI model 1400, a difference value between the evaluation data and the output data, together with the input data. A value of a parameter of a layer configuring a neural network of the AI model 1400 may be updated via the training. However, this is only an example and a method of training the AI model 1400 is not limited thereto.

The server according to an embodiment of the disclosure may obtain scheduling information by inputting, to the AI model 1400 for which the training has been completed, newly obtained information about a required radio resource assignment amount, allowed time latency, and available processor resource. The scheduling information may be the same as that described above with reference to FIG. 3.

Components in the block diagram may be integrated, a component may be added, or a component may be omitted according to the specification of each device that is actually implemented. In other words, two or more components may be integrated into one component or one component may be divided into two or more components when necessary. Also, a function performed by each block is only for describing embodiments of the disclosure and specific operations or apparatuses do not limit the scope of right of the disclosure.

The methods according to the embodiments of the disclosure described in the claims or the detailed description of the disclosure may be implemented in hardware, software, or a combination of hardware and software.

When the methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments of the disclosure described in the claims or the detailed description of the disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory including a combination of some or all of the above-mentioned memories. In addition, each memory may include a plurality of memory units.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according the embodiments of the disclosure. Another storage device on the communication network may also be connected to the apparatus performing the embodiments of the disclosure.

Meanwhile, the embodiments of the disclosure described with reference to the specification and the drawings are merely illustrative of specific examples to easily facilitate description and understanding of the disclosure, and are not intended to limit the scope of the disclosure. In other words, it will be apparent to one of ordinary skill in the art that other modifications based on the technical ideas of the disclosure are feasible. Also, the embodiments of the disclosure may be combined with each other as required. For example, a portion of one embodiment of the disclosure and a portion of another embodiment of the disclosure may be combined with each other to enable a base station and a terminal to operate. Also, other modifications based on technical ideas of the embodiments of the disclosure may be implemented on various systems, such as a frequency-division duplexing (FDD) LTE system, a time division duplexing (TDD) LTE system, a 5G or NR system, and the like.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method, performed by a server, of performing a radio access network function, the method comprising:
obtaining information about traffic to be generated at one or more base stations, based on a scheduling request regarding the one or more base stations;
determining information about time latency and a radio resource requested regarding the traffic, based on the information about the traffic to be generated;
determining scheduling information about a processor resource assigned on at least one pipeline of the at least one processor to process the traffic, based on the information about the time latency and radio resource, and an available processor resource at the server; and
processing the traffic by the at least one pipeline, based on the scheduling information.

2. The method of claim 1, wherein the determining of the scheduling information comprises:
when the time latency requested regarding the traffic is less than a threshold value, determining the scheduling information such that all processor resources requested to process the traffic are assigned; and
when the time latency requested regarding the traffic is equal to or greater than the threshold value, determining the scheduling information such that a minimum processor resource of a pre-set size is assigned.

3. The method of claim 1, further comprising:
obtaining resource monitoring information about a processor resource requested to process traffic generated before the scheduling request,
wherein the determining of the scheduling information comprises determining the processor resource required to process the traffic, based on the information about the time latency and radio resource requested regarding the traffic, by using the resource monitoring information.

4. The method of claim 1,
wherein the information about the traffic to be generated at the one or more base stations comprises information about a size and type of the traffic to be generated at the one or more base stations, and
wherein the type of the traffic is classified according to at least one performance from among a data transmission speed requested for each service that generated the traffic, a transmission latency, and connection density.

5. The method of claim 1, wherein the information about the radio resource comprises information about at least one of a time-frequency resource for transmission/reception of the traffic, a transmission/reception mode between the one or more base stations and a terminal, a number of antenna ports, a number of layers, or channel coding and modulation techniques.

6. The method of claim 1, wherein the determining of the scheduling information comprises determining the scheduling information regarding the processor resource, based on the information about the time latency and radio resource and the available processor resource at the server, by using a pre-generated learning network model.

7. A server for performing a radio access network function, the server comprising:
a transceiver;
a memory storing one or more instructions; and
at least one processor configured to execute the one or more instructions stored in the memory to:
obtain information about traffic to be generated at one or more base stations, based on a scheduling request regarding the one or more base stations,
determine information about time latency and a radio resource requested regarding the traffic, based on the information about the traffic to be generated,
determine scheduling information about a processor resource assigned on at least one pipeline of the at least one processor to process the traffic, based on the information about the time latency and radio resource, and an available processor resource at the server, and
process the traffic by the at least one pipeline, based on the scheduling information.

8. The server of claim 7, wherein the at least one processor is further configured to execute the one or more instructions to:
when the time latency requested regarding the traffic is less than a threshold value, determine the scheduling information such that all processor resources requested to process the traffic are assigned; and
when the time latency requested regarding the traffic is equal to or greater than the threshold value, determine the scheduling information such that a minimum processor resource of a pre-set size is assigned.

9. The server of claim 8, wherein the at least one processor is further configured to execute the one or more instructions to:
when a size of the processor resource assigned to the traffic exceeds a size of the available processor resource at the server, process the traffic after traffic pre-assigned to the at least one pipeline is processed; and
when the size of the processor resource assigned to the traffic is smaller than or equal to the size of the available processor resource at the server, process, by a new pipeline generated to process the traffic, the traffic.

10. The server of claim 8, wherein the at least one processor is further configured to execute the one or more instructions to, when a size of the processor resource assigned to the traffic exceeds a size of the available processor resource at the server and the processing of the traffic has a higher priority than processing of traffic pre-assigned to the at least one pipeline, stop the processing of the pre-assigned traffic and processing the traffic.

11. The server of claim 10, wherein the at least one processor is further configured to execute the one or more instructions to:
when the processing of the pre-assigned traffic is stopped, generate a new pipeline to process the traffic; and
process the traffic by the generated new pipeline.

12. The server of claim 7, wherein the at least one processor is further configured to execute the one or more instructions to:
obtain resource monitoring information about a processor resource requested to process traffic generated before the scheduling request; and
determine the processor resource required to process the traffic, based on the information about the time latency and radio resource requested regarding the traffic, by using the resource monitoring information.

13. The server of claim 7,
wherein the information about the traffic to be generated at the one or more base stations comprises information about a size and type of the traffic to be generated at the one or more base stations, and
wherein the type of the traffic is classified according to at least one performance from among a data transmission speed requested for each service that generated the traffic, a transmission latency, and connection density.

14. The server of claim 7, wherein the at least one processor is further configured to execute the one or more instructions to determine the scheduling information regarding the processor resource, based on the information about the time latency and radio resource and the available processor resource at the server, by using a pre-generated learning network model.

15. A computer program product comprising a computer-readable recording medium storing a program that enables a server to perform a method of performing a radio access network function, the method comprising:
  obtaining information about traffic to be generated at one or more base stations, based on a scheduling request regarding the one or more base stations;
  determining information about time latency and a radio resource requested regarding the traffic, based on the information about the traffic to be generated;
  determining scheduling information about a processor resource assigned on at least one pipeline of the at least one processor to process the traffic, based on the information about the time latency and radio resource, and an available processor resource at the server; and
  processing the traffic by the at least one pipeline, based on the scheduling information.

* * * * *